(12) United States Patent
Specht et al.

(10) Patent No.: US 12,290,875 B2
(45) Date of Patent: May 6, 2025

(54) ARTICLE COMPRISING A METAL SUBSTRATE AND A CHANNEL IN THE METAL SUBSTRATE AND METHOD FOR PRODUCING SAME

(71) Applicant: Fraunhofer-Gesellschaft zur Förderung der angewandten Forschung eingetragener Verein, Munich (DE)

(72) Inventors: Uwe Specht, Bremen (DE); Dirk Salz, Bremen (DE); Thomas Lukasczyk, Bremen (DE); Ralph Wilken, Bremen (DE); Kai Borcherding, Bremen (DE); Linda Gätjen, Bremen (DE); Tim Heusinger von Waldegge, Bremen (DE); Nane Nolte, Bremen (DE)

(73) Assignee: Fraunhofer-Gesellschaft zur Förderung der angewandten Forschung eingetragener Verein, Munich (DE)

( * ) Notice: Subject to any disclaimer, the term of this patent is extended or adjusted under 35 U.S.C. 154(b) by 929 days.

(21) Appl. No.: 17/311,981

(22) PCT Filed: Dec. 18, 2019

(86) PCT No.: PCT/EP2019/086112
§ 371 (c)(1),
(2) Date: Jun. 8, 2021

(87) PCT Pub. No.: WO2020/127594
PCT Pub. Date: Jun. 25, 2020

(65) Prior Publication Data
US 2022/0048133 A1    Feb. 17, 2022

(30) Foreign Application Priority Data
Dec. 21, 2018 (DE) .......................... 102018133553.9

(51) Int. Cl.
*B23K 26/0622* (2014.01)
*B23K 26/142* (2014.01)
(Continued)

(52) U.S. Cl.
CPC ........ *B23K 26/0622* (2015.10); *B23K 26/142* (2015.10); *B23K 26/16* (2013.01);
(Continued)

(58) Field of Classification Search
None
See application file for complete search history.

(56) References Cited

U.S. PATENT DOCUMENTS

| 4,504,727 A | * | 3/1985 | Melcher | ............... | B23K 26/705 |
| | | | | | 219/121.62 |
| 2002/0111029 A1 | | 8/2002 | Johnson | | |

(Continued)

FOREIGN PATENT DOCUMENTS

| CN | 103946005 A | 7/2014 |
| CN | 104602889 B | 5/2015 |

(Continued)

OTHER PUBLICATIONS

European Official Communication, EP Application No. 19 835 281.7—dated Nov. 24, 2023.
(Continued)

*Primary Examiner* — Elizabeth M Kerr
(74) *Attorney, Agent, or Firm* — Verrill Dana, LLP

(57) ABSTRACT

An article having a metal substrate and a channel in the metal substrate which is partly or completely open to the surface, wherein the cross section of the channel has a local width maximum (5) between the channel base (7) and the contact plane (1), measured parallel to the contact plane and (Continued)

at right angles to the longitudinal channel axis in the section perpendicular to the surface. (FIG. 1a).

18 Claims, 19 Drawing Sheets

(51) Int. Cl.
*B23K 26/16* (2006.01)
*B23K 26/352* (2014.01)
*C22F 3/00* (2006.01)

(52) U.S. Cl.
CPC ........ *B23K 26/355* (2018.08); *B23K 26/3584* (2018.08); *C22F 3/00* (2013.01)

(56) References Cited

U.S. PATENT DOCUMENTS

| | | | | |
|---|---|---|---|---|
| 2012/0192999 | A1* | 8/2012 | Khan | B23K 26/0006 525/437 |
| 2015/0060419 | A1* | 3/2015 | Green | B23K 26/14 219/121.62 |
| 2016/0046050 | A1* | 2/2016 | Ikeda | B32B 27/08 219/121.66 |
| 2017/0014946 | A1 | 1/2017 | Yilbas et al. | |
| 2017/0136668 | A1 | 5/2017 | Kose et al. | |
| 2019/0001442 | A1* | 1/2019 | Unrath | B23K 26/0622 |
| 2019/0168340 | A1* | 6/2019 | Henrottin | B23K 37/0235 |

FOREIGN PATENT DOCUMENTS

| | | |
|---|---|---|
| CN | 104838046 B | 11/2017 |
| EP | 1302545 B1 | 5/2010 |
| JP | 2016043413 A | 4/2016 |
| WO | 9813537 | 4/1998 |
| WO | 2007111518 A1 | 10/2007 |
| WO | 2010130528 A1 | 11/2010 |
| WO | 2013077277 A1 | 5/2013 |
| WO | 2014038563 A1 | 3/2014 |
| WO | 2017191013 A1 | 11/2017 |

OTHER PUBLICATIONS

Roesner, Andrew et al. "Laser Assisted Joining of Plastic Metal Hybrids," Physics Procedia vol. 12, Dec. 31, 2011, pp. 370-377, Elsevier Available online at www.sciencedirect.com.

* cited by examiner

ARTICLE COMPRISING A METAL SUBSTRATE AND A CHANNEL IN THE METAL SUBSTRATE AND METHOD FOR PRODUCING SAME

The invention relates to an article having a metal substrate and a channel in the metal substrate which is completely or partly open to the surface, wherein the channel has a very specific geometry. The invention further relates to a process for producing an article of the invention using pulsed laser radiation. The invention also relates to the article having a metal substrate and a channel in the metal substrate, produced or producible by the process of the invention, and to the use of the article of the invention.

BACKGROUND OF THE INVENTION

Prior Art

The absorption of liquid substances, viscous substances, or substances dissolved or suspended in a solvent, into the interface of a metallic workpiece requires a surface structure into which the substance can penetrate and be absorbed. Such structures can be utilized for contact surfaces, for example seals or bearings in moving components, for absorption of lubricants, glidants or sealants that are gradually released to the contact surface in operation. In the field of medical technology too, such structuring can be utilized for the modification of implant surfaces. Through the intercalation and controlled release of antibiotics or other active antibacterial ingredients, BMPs ("bone morphogenetic protein"), cytostatics or organisms (e.g. phages), it is possible to more effectively prevent and treat implant-associated infections at the site where they arise.

The production or deposition of such storage-capable layers on metallic raw material surfaces can be effected by means of different methods. A major influence on the capacity to absorb and the rate of release of substances is possessed by the shape and size of the structures and the thickness of the structured layer.

Structured and storage-capable surfaces on metallic raw materials may be introduced in the prior art by specific rolling methods at the early stage of the production process. Alternatively, they can be produced subsequently by deposition of a coating or from the raw material itself by material removal or a structural alteration of the interface layer. Pore structures that are found to be of good suitability with regard to high storage capacity are found to be pore structures that can be produced in different layer thicknesses and pore densities according to the method.

For example, it is possible by thermal spraying methods (e.g. flame spraying or light arc spraying) to produce layers having a pore structure. According to the coating material and parameters, it is possible in this way to produce layers having a porosity between 3% and 15% (cf. Oerlikon Metco. *Einführung Thermisches Spritzen* [Introduction to Thermal Spraying]—6th edition. July 2016). It is not possible to produce other forms of structure by means of thermal spraying methods. Since these techniques typically lead to a distinct thermal input onto the substrate, they are unsuitable for thermally sensitive raw materials.

A further method is the sol-gel method. It is possible by a suitable adjustment of the reaction parameters to produce dipping sols that produce a porous layer on the substrate with a porosity of 50% to 85% (cf. Heidenau, Frank, et al., Offenporige, bioaktive Oberflächenbeschichtungen auf Titan [Open-Pore Bioactive Surface Coatings on Titanium]. Biomaterialien. 2001, vol. 2, 1.).

The limiting factor in coatings is generally that there must be good layer binding to the raw material, especially under mechanical stress. By contrast, structures that are produced directly from the base material are found to be advantageous. According to the raw material, different materials are employable here.

In the MAO method ("microarc oxidation" or alternatively "plasma electrolytic oxidation (PEO)"), oxide layers are built up on metallic surfaces, for example titanium or titanium alloys. By a suitable choice of process parameters, it is possible here to produce pore structures having a marked aspect ratio. A disadvantage in this process are the chemicals needed according to the metal, some of which are highly hazardous to health.

In the case of aluminum or aluminum alloys, the eloxal method is additionally known. An electrolytic oxidation here converts the uppermost metal layers to an open-pore oxide or hydroxide. Closing of the pores is possible by subsequent densification, for example in hot steam or water. However, the application of the eloxal method is limited to aluminum.

It is additionally possible to produce structured surfaces by particular wet-chemical pickling processes that are possibly suitable for the absorption of pasty substances. However, the structures typically do not have a regular form. The process is additionally greatly limited to the respective substrate materials (e.g. aluminum alloys).

For the local structuring of metallic surfaces, laser processes have additionally become established, especially by means of ultrashort pulse lasers in the femto- or picosecond range. The technique enables removal of material without significant thermal input into the base material.

US2008216926 describes the production of nanostructures by means of a femtosecond laser. However, a nanostructured surface is found to be inadequate for the storage and release of substances or active ingredients.

WO10130528 describes the production of microstructures by repeated treatment with a pulsed laser in the picosecond range. The method enables the creation of pores having reduced pore opening diameters ("keyholes") or with partial overhangs at the pore opening. It is possible to utilize such structures for medical implants (improved growth behavior and strength) or mechanical locking in adhesive bonds.

US2016059353 describes a method of production of microporous by a laser treatment beneath the material-specific ablation threshold (energy density needed for material removal). The laser treatment is effected here until the pore structure is formed (more than 1000 or 2000 times). This type of process regime leads to a low level of performance per unit area of the treatment. The method is not specifically tied to one type of laser. However, treatment below the ablation threshold means that only structures that are not very pronounced and have low structure depths can form (lack of material removal). Accordingly, they have only low storage capacity for liquid or pasty media.

CN105798454 describes a set up for treatment of surfaces with nanosecond lasers for the creation of cracks in the near-surface region.

The above-described documents in the laser sector relate predominantly to lasers with ultrashort pulses in the pico- or femtosecond range. These systems can be utilized for the creation of defined structures without any significant thermal input into the surrounding material. Disadvantages here are the comparatively high capital costs and the low area rate achievable. Near-surface and highly structured layers that have been produced from a metallic base material additionally have typically only low mechanical stability.

BRIEF SUMMARY OF THE INVENTION

Against this background, it was an object of the present invention to provide an article that alleviates individual, multiple or as many as possible of the described disadvantages of the prior art. It was of course also part of the object to describe a corresponding process for producing such a problem-solving article.

With regard to the article, the object of the invention is achieved by an article having a channel in the metal substrate which is completely or partly open to the surface, wherein the cross section of the channel has a local width maximum (5) between the channel base (7) and the contact plane (1), measured parallel to the contact plane and at right angles to the longitudinal channel axis in the section perpendicular to the surface, and wherein there is a heat-affected zone having an altered grain size structure compared to the metal substrate in the region of the channel surface.

In the article of the invention, the metal substrate is provided on at least one surface, preferably that the article itself consists predominantly or entirely of metal. The particular geometry of the channel provided in accordance with the invention (of course also including the possibility that a multitude of channels may also be provided) firstly points to the specific production process; it secondly enables a multitude of applications.

The contact plane in the context of the invention, especially in cross section (section preparation), is defined as follows: if there is a channel opening at the site to be examined, a circle having a radius of 3 mm is inserted graphically above this channel opening such that this circle touches the substrate envisaged in accordance with the invention exactly twice (once on each side of the channel). This situation is shown schematically in FIG. 1b on the right-hand side. The secant that runs through these two contact points then constitutes the contact plane.

A "heat-affected zone" in the context of this text is a region which is physically different compared to the substrate material, the difference being creatable, or preferably having indeed been created, by heat treatment of the substrate. In particular, a heat-affected zone in the context of this text is characterized by an altered grain size structure compared to the metal substrate. For avoidance of doubt, an altered grain size structure means that there is an altered average statistical grain size compared to the grain size of the metal substrate (unaffected by heat) in the heat-affected zone.

If the channel is closed in terms of its cross section, it may be the case that generally two positions for the circle having radius 3 mm are conceivable (cf. left-hand side of FIG. 1b). In this case, it is the secant that, under the aforementioned conditions, intersects with the corresponding circle of radius 3 mm such that the longer distance is present within the circle that is crucial for the definition of the contact plane.

For avoidance of doubt, what is important is that the two points of contact of the circle having radius 3 mm, from the point of view of the substrate, "lie on" the convex-curved lines.

The longitudinal channel axis in the context of the invention is the line that, for avoidance of doubt, results from the channel bases of multiple sections which, for avoidance of doubt, each run at right angles to the longitudinal channel axis at a distance of s one tenth of the width maximum of the channel.

As already indicated above, the specific geometry of the channel in the article of the invention is obtainable via a novel production process of the invention (cf. further down). In principle, this comprises treatment with pulsed laser radiation, with the pulses hitting the same site on the metal substrate repeatedly. For details, there is further information further down in the context of the present description.

By the guiding of the laser in the process of the invention, it is possible to configure the channels in different ways along the longitudinal axis of the channel; it is possible to configure straight lines and multiple channels in parallel, which is preferred in many cases.

Alternatively, it is possible to configure the channel to be provided in accordance with the invention in a meandering line or to provide a multitude of channels that may also have crossings, for example.

BRIEF DESCRIPTION OF THE SEVERAL VIEWS OF THE DRAWINGS

The terms 'fig.' or 'figure' and 'figs.' or 'figures' are used interchangeably throughout the application and figures of the drawings.

FIG. 1b shows a schematic of FIG. 1a, in each case with the circle having radius 3 mm for definition of the contact plane drawn in;

Figure 1A:
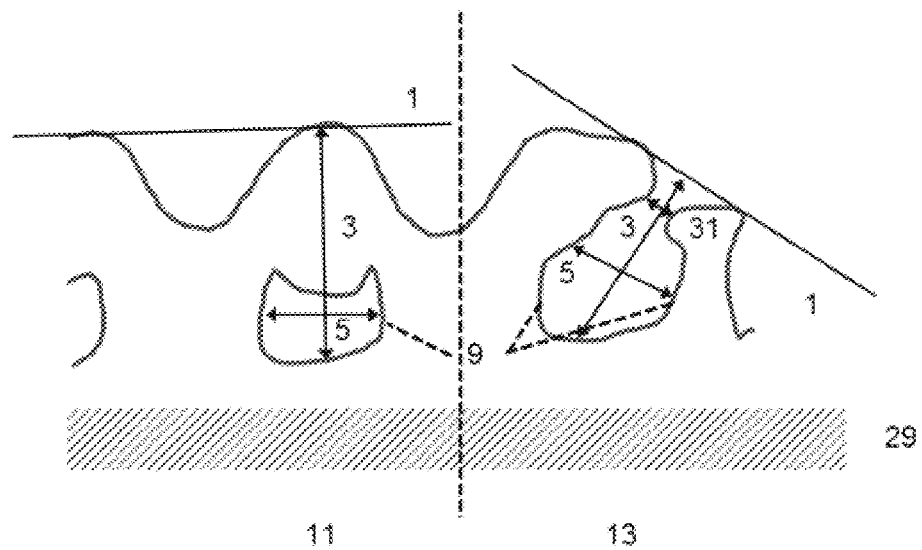
FIG. 1a shows a schematic of a cross section through the metal substrate, coinciding with a channel in the middle that is closed at the plane of the section, whereas the channel on the right is open at the plane ofthe section.

For the geometric description of the channels, reference is also made to the figures. In the figures, the reference numerals have the following meaning:
 1 contact plane
 3 channel depth
 5 max. channel width
 6 channel length
 7 channel base
 9 channel edge
 11 complete channel cover
 13 partial channel cover
 15 crossing channels
 17 meandering channels
 19 parallel section to the article surface
 21 perpendicular section to the surface
 23 heat-affected zone in the opening region
 25 heat-affected zone in the region of the lowest point of a channel
 27 grain size of substrate
 29 substrate
 31 opening width The figures here have the following meaning:

FIG. 1*a* shows a schematic of a cross section through the metal substrate, coinciding with a channel in the middle that is closed at the plane of the section, whereas the channel on the right is open at the plane of the section.

Figure 1B:
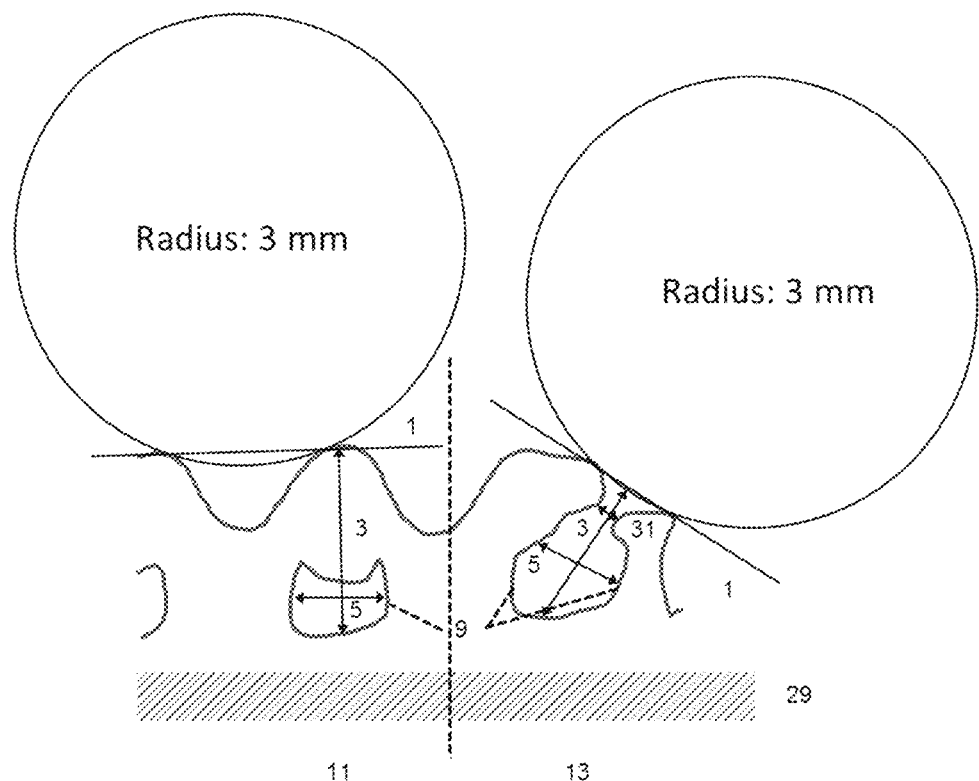

FIG. 1*b* shows a schematic of FIG. 1*a*, in each case with the circle having radius 3 mm for definition of the contact plane drawn in.

Figure 2:
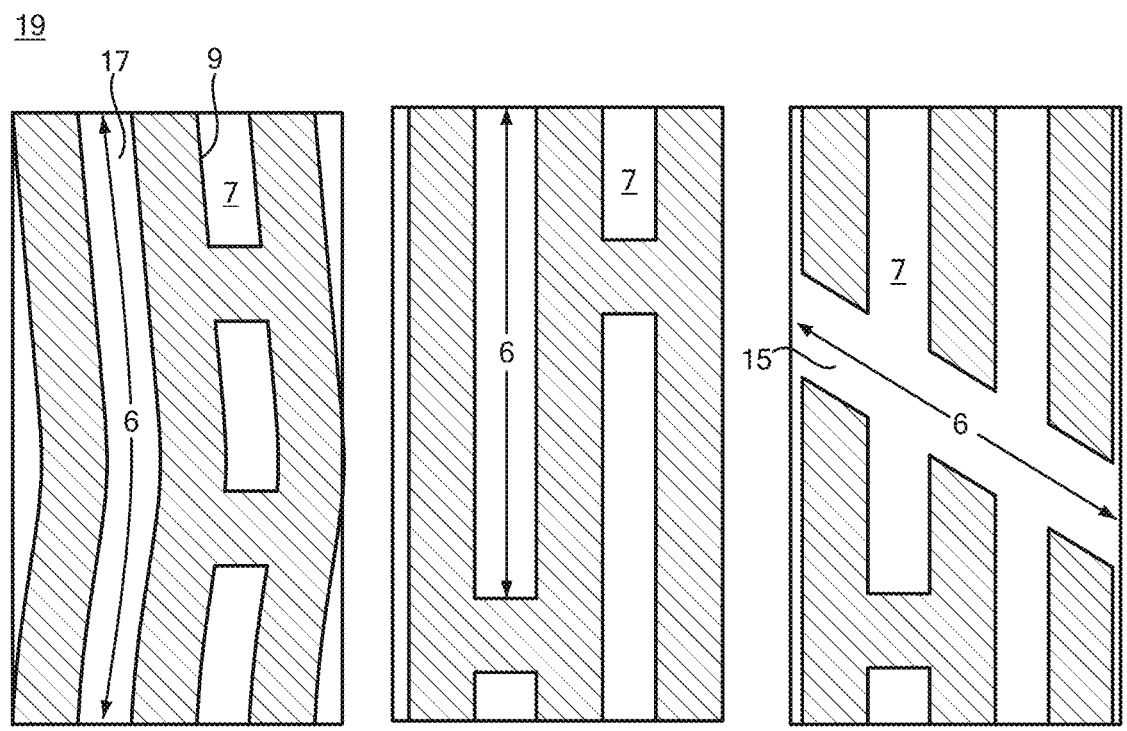
FIG. 2 shows a schematic of a parallel section to the substrate surface, and shows a meandering channel on the left, parallel channels in the middle, and crossing channels on the right, each in schematic form.

FIG. 2 shows a schematic of a parallel section to the substrate surface, and shows a meandering channel on the left, parallel channels in the middle, and crossing channels on the right, each in schematic form.

Figure 3:
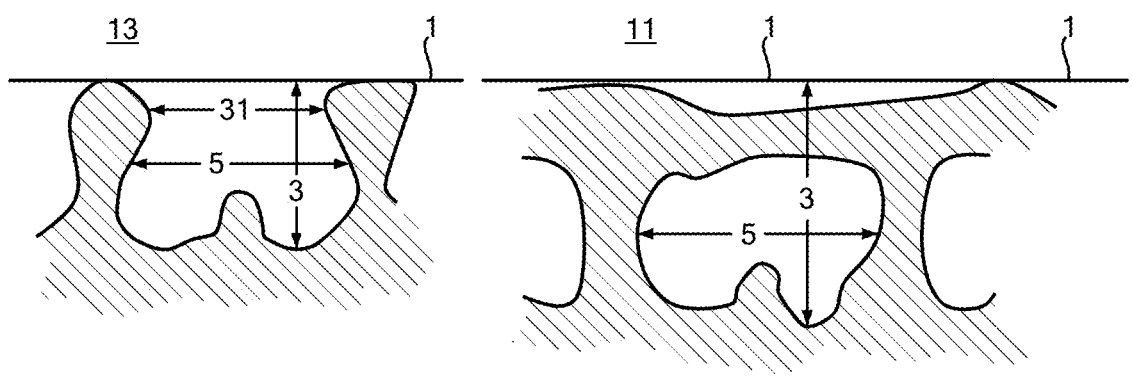
FIG. 3 in turn is a schematic cross section through the metal substrate and shows channel structures that consist in principle of intermerging channels, but which are each regarded as one channel for the purposes of the present invention.

FIG. 3 in turn is a schematic cross section through the metal substrate, and shows channel structures that consist in principle of intermerging channels, but which are each regarded as one channel for the purposes of the present invention.

Figure 4:
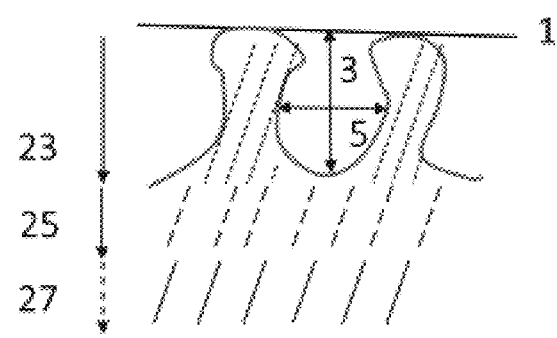
FIG. 4 in turn shows a schematic cross section through the metal substrate in the reqion of a channel, with the heat-affected zones that are the result of the process of the invention shown separately.

FIG. 4 in turn shows a schematic cross section through the metal substrate in the region of a channel, with the heat-affected zones that are the result of the process of the invention shown separately.

In the context of the present invention, preference is given to an article of the invention wherein the local width maximum (5) is ≥0.5 μm beneath the contact plane (1).

Any particular structure is suitable for a multitude of applications.

Preference is likewise given to an article of the invention wherein the channel has an aspect ratio of the local width maximum (5), measured at right angles to the longitudinal channel axis, to the channel length of ≤1:3 preferably ≤1:10 and more preferably ≤1:100, and/or the channel has a length of ≥3 μm, preferably ≥100 μm and more preferably ≥500 μm, wherein the channel length in each case is measured parallel to the article surface.

Also preferred in accordance with the invention is an article of the invention wherein the channel has a depth (3) of 0.1 μm to 10 000 μm, preferably of 0.2 μm to 1000 μm and more preferably in the range from 0.5 μm to 500 μm, measured at right angles to the contact plane (5).

Also preferred in accordance with the invention is an article of the invention wherein the openings of the channel have a width of 0.05 μm to 2000 μm, measured in the contact plane (5), at right angles to the longitudinal channel axis.

All these structural configurations can firstly be created in a suitable and reproducible manner by the process of the invention described further down; secondly, they result in a multitude of properties that enable use of channel or article of the invention in a particularly suitable manner for the fields of use that are likewise described further down.

Preference is given in accordance with the invention to an article of the invention wherein the channel is covered to an extent of ≥30%, preferably ≥50% and in each case further preferably to an extent of ≥70%, ≥80%, ≥90%, ≥95% and ≥99%, based on the plane formed by the width maximum (5) within the channel parallel to the contact plane.

It is possible in accordance with the invention to control the level of coverage of the respective channels by suitable process control. It is always the case here, in the context of the present invention, that every channel has at least one opening to the surface. According to the end use, it may be advisable to leave greater or smaller areas of the channel uncovered. In this way, it is possible to control the rate of release of the channel contents. At the same time, it is possible, when the channel is intended for end uses that essentially require transport of material between two different locations, to configure the channel largely as a closed tube. Especially for such purposes, but also for purposes where slow release of the channel contents is desired, it is desirable that the channel is very substantially or completely covered.

Preference is given to an article of the invention having a first heat-affected zone in the opening region of the channel with a smaller average statistical grain size compared to the metal substrate in a ratio of min. 1:2, more preferably min. 1:10, and a second heat-affected zone in the region of the lowest point of the channel or of the channel cross section with a thickness of 0.1 µm to 3000 µm, preferably in the range from 0.2 µm to 1000 µm, more preferably in the range from 0.5 µm to 500 µm, and wherein the second heat-affected zone, vertically from the lowest point in the channel cross section, has a smaller average statistical grain size compared to the metal substrate of preferably ≤1:1.2 and more preferably ≤1:5, and a greater average statistical grain size of preferably ≥2:1.2 compared to the first heat-affected zone.

In the case of laser treatment of an alloy, the first heat-affected zone may be characterized by a martensitic microstructure which is formed by rapid solidification after melting. By way of example, in the case of Ti6Al4V for the formation of a martensitic microstructure, the rate of solidification must be at least 640° C./s. It may thus be preferable to find a martensitic microstructure in the first heat-affected zone in the article of the invention.

This configuration of the heat-affected zones indicates firstly that the process of the invention has been employed for creation of the article of the invention; secondly, the corresponding heat-affected zones result in various possible configurations: for instance, it is possible that channel cover is configured from the region of the first heat-affected zone; in addition, the heat-affected zones that are to be provided with particular preference in accordance with the invention are of particularly good suitability for control of the surface properties of the channel surfaces by a subsequent treatment.

Preference is given to an article of the invention wherein the metal substrate is selected from the group consisting of titanium, aluminum, vanadium, magnesium, copper, silver, lead, gold, alloys thereof with one another or with further metals, and steel.

These materials can be provided particularly efficiently with an appropriate channel structure for the process of the invention (see below). They are additionally particularly suitable for many end uses.

Preference is given in accordance with the invention to an article of the invention having an oxygen-enriched layer compared to the substrate along the channel walls, wherein the oxygen enrichment measured at a depth of 50 nm, preferably 500 nm, is min. 5%, measured by means of XPS after sputtering, and/or having a nitrogen-enriched layer compared to the substrate along the channel walls, wherein the nitrogen enrichment measured at a depth of 50 nm, preferably 500 nm, is min. 5%, measured by means of XPS after sputtering.

Firstly, the enrichment of nitrogen or oxygen suggests that the process of the invention has been performed (for avoidance of doubt performed under an oxygen atmosphere or nitrogen-enriched atmosphere, according to which of the elements has been enriched compared to the substrate); secondly, the elemental composition of the channel surface that has been altered as well as the particle size also offers further approaches for subsequent treatments, for example for adjustment of the surface character.

It is preferable in accordance with the invention that the article of the invention has an (encasing) interfacial layer around the channel that has a depth of ≥50 mm, preferably ≥500 mm, in which the oxygen concentration is ≥0.5 atom %, preferably ≥5 atom %, and/or the nitrogen concentration is ≥0.5 atom %, preferably ≥5 atom %.

The atomic percentages mentioned are each based on the entirety of all elements detectable by XPS.

For avoidance of doubt, the XPS measurement is effected with an upstream argon glovebox for the handling of air-sensitive samples. Parameters: for depth measurement by means of XPS, material is removed from the surface, for example, by means of an argon ion sputtering source. Sputtering is effected until, according to the high-resolution spectra, the main element of the alloy (i.e. the element having the highest concentration in the alloy or, in the case of a pure metal, that metal) is in metallic elemental form (≥95 atom %); the XPS measurement of the oxygen concentration or nitrogen concentration at this point then preferably gives the abovementioned values.

The article of the invention preferably has specifically adjusted properties in the region of the channel, especially with regard to surface energy or wetting characteristics. It is possible here to make the corresponding surface properties homogeneous over the entire channel or the entirety of all channels; it is alternatively possible to establish gradated or locally different surface properties; for example, different channels could have different surface properties, for example hydrophilic, lipophilic, amphiphilic or oleophilic regions; the adjustment can be effected, for example, via the following methods: CVD or PVD methods, for example sputtering of titanium or deposition of plasma-polymeric layers by the PECVD method. Surface energies can preferably be adjusted by means of plasma-polymeric coatings according to DE 102005052409 B3.

The surfaces of the channel to be provided in accordance with the invention preferably at least locally have a contact angle of ≤60°, more preferably ≤30° and most preferably 0°, especially when the surfaces are to have a hydrophilic, lipophilic or amphiphilic configuration. Hydrophobic and lipophilic surfaces that are optionally to be provided in accordance with the invention preferably have a contact angle of ≥90°, more preferably ≥120°, where surface energy and contact angle are measured by means of static contact angle measurement according to DIN 55660-2:2011-12.

In the context of the invention, it may be preferable to further optimize the surface properties of this article of the invention for its desired end use, especially for the purposes of the uses that are described as preferred here in this text. For this purpose, it may be preferable to apply a further coating, especially for improvement of biocompatibility, for improvement of (target) hydrophilic properties, for improvement of tribological properties, for improvement of corrosion protection or for improvement of adhesive properties.

In some cases, it may also be preferable in accordance with the invention that no additional coating is present on the metal substrate of the invention. It is likewise preferable that, if a further coating is present, this coating then reduces the ratio of the channel openings, measured in the contact plane at right angles to the longitudinal channel axis, to the local width maximum between the channel base and the contact plane by a maximum of 10% compared to a situation in which the additional coating is absent.

Also part of the invention is a process for producing an article of the invention having a metal substrate, comprising the steps of
  a) providing an article having a metal substrate and
  b) irradiating the metal substrate with a pulsed laser, wherein the irradiation is effected at the same site with at least 2 pulses, preferably at least 5 pulses, further preferably 2-2000 pulses, more preferably 5-100 pulses, in a pulse repetition frequency of at least 0.1 kHz, wherein the laser radiation used preferably has a wavelength in the range from 400 nm to 30 µm and the pulse length for the pulses is preferably in the range of 500 ps to 100 s.

For the creation of a channel, the laser treatment described in step b) has to be conducted repeatedly, with the site to be treated in each case preferably at a defined distance from the site treated immediately beforehand (if it is not the commencement of a new channel). The orientation of the individual sites relative to one another defines the later channel alignment. The distance between the sites can be described by the pulse overlap in the scanning direction and is dependent on the spot diameter at the focus (measurable by the standard methods for laser technology).

For the process of the invention, it is preferably-25% to 90% of the spot diameter at the focus, more preferably 10% to 75% of the spot diameter of the focus (a negative figure for spot diameter describes two positions with a region in between where there is no incident laser power). Parallel channels are created by a repetition of this linear treatment at a defined distance from the first channel. The distance in this linear treatment is dependent on the desired density of the channels and the superposition and coverage of the individual channels.

Preference is given in accordance with the invention to a process of the invention wherein the laser radiation used has a wavelength in the range from 400 nm to 30 µm, preferably from 950 nm to 12 µm.

Preference is likewise additionally given to a process of the invention wherein the pulse repetition frequency is in the range from 0.1 KHz to 4 MHZ, preferably in the range from KHz to 250 KHz.

It is further preferable in the process of the invention that the pulse length for the pulses is in the range of 500 ps to 100 s, further preferably in the range of 1 ns to 100 µs, more preferably in the range of 5 ns to 10 µs. This has a positive influence on the formation of the desired structures in the process of the invention.

It is generally preferable that the energy density measured in the sample position by means of a pyroelectric sensor at the laser beam focus is 0.1 $J/cm^2$ to 100 $J/cm^2$, more preferably in the range of 1 $J/cm^2$ to 20 $J/cm^2$.

In the process of the invention, it is further preferable that the energy distribution in the laser spot has a Gaussian profile or flat-top profile or top-hat profile.

All these details of the process regime, any individual or arbitrary combination thereof, and very particularly the combination of all these variants, has/have the effect that the article of the invention can be produced particularly reliably and in particularly good shape.

Preference is given in accordance with the invention to a process of the invention wherein the metal substrate is irradiated in step b) with a CW or QCW laser, wherein the local residence time of the laser pulse in a surface region corresponding to the spot size is at least 5 ns, preferably at least 25 ns, further preferably in the range between 40 ns and 2 ms, more preferably 50 ns-500 ns.

It is preferable in the context of the invention that, after step b) in the process of the invention, the laser is moved such that, in the repetition of step b), the pores created collectively result in a channel completely or partly open to the surface.

This process regime is of course advisable because, in this way, two adjacent pulse loci are collectively involved in channel formation. In principle, it is of course also possible to guide the laser such that individual pores are formed at first, which are fused together later, in a new pass, to form channels.

Also part of the invention is an article of the invention produced or producible by a process of the invention, preferably in a preferred embodiment.

The process of the invention is applicable in principle to all metallic materials, provided that these form a melt phase under laser irradiation. The wavelength emitted in the laser source used is unlimited. However, preference is given to a wavelength and pulse duration that lead to a thermal interaction on the material. Particular preference is given to lasers in the near-IR (fiber or Nd:YAG laser) or mid-IR range (CO2 laser) with pulse durations greater than or equal to the ns range (≥1 ns). The fluence incident on the surface must be sufficiently high to create a melt front. The pulse frequency must be chosen such that the time between two pulses is not sufficient for resolidification of the melt front.

Also part of the invention is the use of an article of the invention, wherein the metal substrate provided with one (or more) channel(s) is used as a storage layer for active substances preferably selected from the group of the phages, antibiotics, virustatics, chemostatics, cytostatics, bioglass, and/or
- as storage layer for nutrient media for cells, preferably tricalcium phosphate, glucose, lipids, amino acids, proteins, minerals, and/or
- as habitat for cells, preferably human cells, preferably human stem cells and/or fungi and/or spores and/or bacteria, and/or
- as a substrate for improving osseointegration, i.e. the incorporation of or enabling of overgrowing with osteoblasts.

An inventive use of the article of the invention is also the use of the metal substrate provided with one or more channels as storage layer for tribologically active substances, preferably those for reduction of friction, for example lubricants, especially oils, nonmetallic particles, preferably particles of crystalline substances having the P63/mmc space group (space group No. 194), further preferably inorganic substances, further preferably from the group of the graphites, molybdenum disulfides, tungsten disulfides, intercalate compounds thereof, and/or for absorption of oils, proteins, hormones and/or heavy metal ions.

In addition, the article of the invention can be used in the region of a heat exchanger.

By virtue of the specific structuring in the article of the invention, it is additionally suitable for use of improved bonds or for creation of cohesive bonds, especially in the case of metallic compounds, since infiltration of metal into the channels is possible.

Also part of the invention is the use of an article of the invention for absorption and time-delayed release of liquids, gases and/or solids in or from the channel to be provided in accordance with the invention.

The absorption capacity of the channel of the invention, based on the channel base area, i.e. the local width maximum (5) of the channel multiplied by the channel length (6), is preferably ≥0.0001 $cm^3/cm^2$, further preferably ≥0.001 $cm^3/cm^2$, further preferably ≥0.01 $cm^3/cm^2$, more preferably ≥0.1 $cm^3/cm^2$.

For the avoidance of doubt, the measurement of channel volume is found by means of weighing the material absorbed (difference weighing before absorption and after absorption).

Also part of the invention is the use of the article of the invention for transport of liquids, dispersions and/or gases through the channels. This is possible, for example, by partly immersing the article of the invention into a liquid, for example water, and exiting of the corresponding liquid at the end of the channels.

EXAMPLES

Figure 5A:
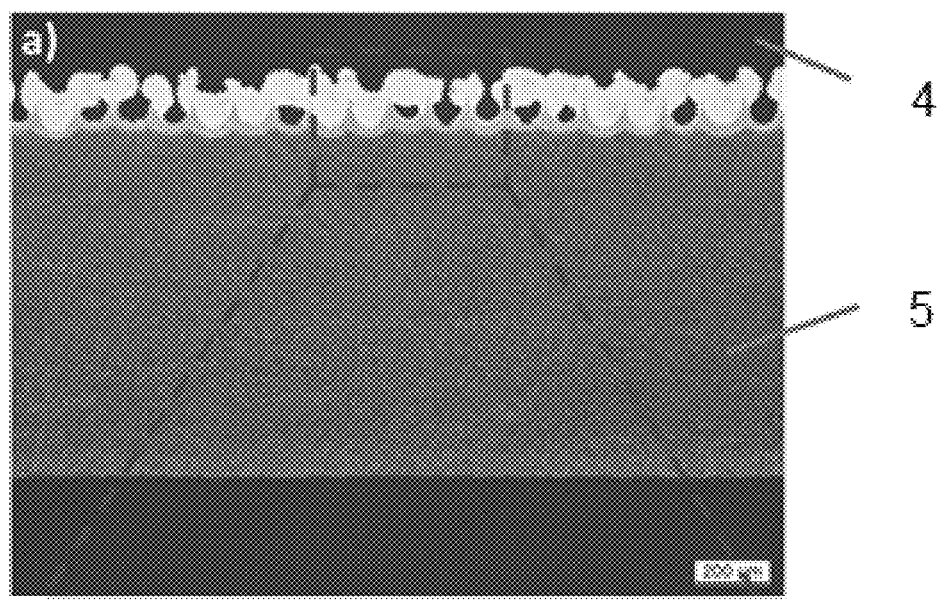
FIG. 5a shows a microscope characterization of a section in X direction, i.e. perpendicular to the direction of laser movement for the surface-modified substrate produced in example 1.
Figure 5B:
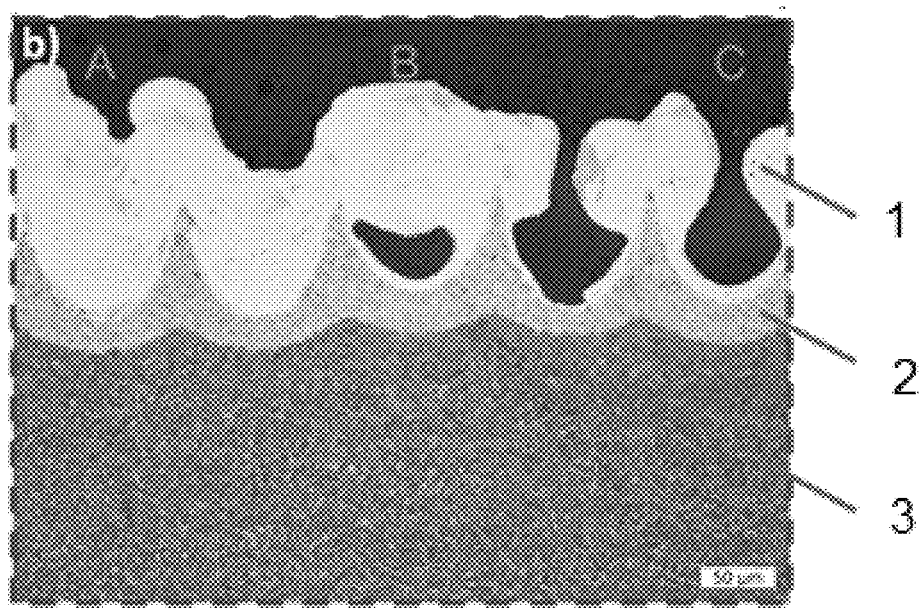
FIG. 5b shows a microscope characterization of a section in X direction, i.e. perpendicular to the direction of laser movement for the surface-modified substrate produced in example 1.
Figure 6:
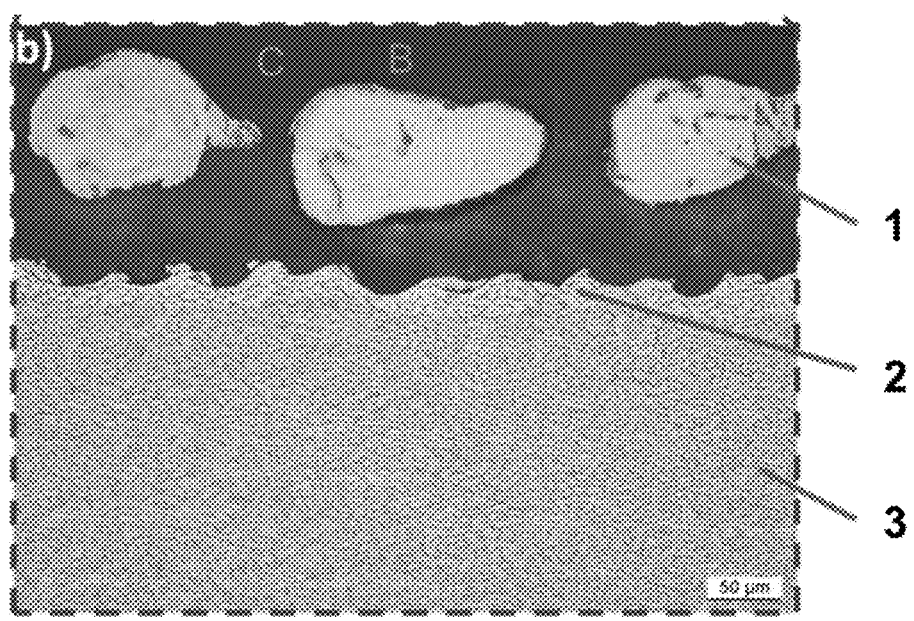
FIG. 6 shows the section preparation parallel to channel direction showing a completely permeable channel with covered part-reqions (B) and open part-regions (C) in the visible sample region.

Example 1: Section Preparation in a Laser-Induced Channel Structure on a Flat Ti6Al4V Substrate Process Conditions/Parameters:
Material: flat Ti6Al4V substrate (supplier: Rocholl GmbH, Aglasterhausen, Germany)
Laser: 100 W Nd:YAG laser (CL100 type from CleanLaser, Herzogenrath, Germany, with stamp optics and f(330) f-theta lens)
Wavelength emitted: 1064 nm
Energy distribution in the laser spot: Gaussian
Spot diameter at the focus: about 107 μm
Target power: 100% (100 W)
Pulse repetition frequency: 200 kHz
Pulse length: 199 ns
Laser fluence at the substrate: 5.3 J/cm$^2$
Number of directly successive laser pulses per position: 25
Number of repetitions of the complete laser treatment (number of cycles): 1
Overlap in the advance between the individual laser positions: 50%
Line overlap: 0%
Analysis:
Method: section preparation and characterization by optical microscopy
Preparation: etching with a mixture of 97 ml of H$_2$O and 3 ml of HF
Section orientation: perpendicular (FIG. 5) and parallel (FIG. 6) to the direction in which the laser advances in the line (resulting in perpendicular or parallel alignment of the channels)
Results:
The Ti6Al4V surface produced with the process parameters described has a parallel channel structure, with the channels at the surface being partly closed and having regular openings:
FIGS. 5a and 5b show a microscope characterization of a section in X direction, i.e. perpendicular to the direction of laser movement for the surface-modified substrate produced in example 1. The reference numerals have the following meanings:
(1): finest grain size distribution
(2): coarser grain size distribution compared to (1)
(3): coarser grain size distribution compared to (1) and (2)
(4): embedding compound
(5): unmodified Ti6Al4V The section preparation perpendicular to channel direction (FIGS. 5a and 5b) shows channels locally closed at the site of the section (A), and channels covered in the upward direction (B) or having a keyhole-shaped opening (C). These forms of structure oscillate along the channels with the process parameter used. The edge zones of the channels have a grain size distribution altered compared to the base structure (bulk material) of the metal alloy. At the base of the channel there is firstly a phase of ultrafine grain size distribution (1), and under that two further phases having increasing coarsening of the grain size distribution (2) and (3). This is characteristic of the laser process of the invention in the case of treatment on Ti6Al4V in particular, and the structures formed on that material thereby.

The section preparation parallel to channel direction (FIG. 6) shows a completely permeable channel with covered part-regions (B) and open part-regions (C) in the visible sample region.

Example 2: Chemical Composition of the Laser Interaction Zones and of the Unaffected Bulk (Corresponding to Example 1)

Modified substrate produced according to example 1 was further characterized by energy-dispersive x-ray spectroscopy (EDX) after section preparation as in example 1. No differences in the element concentrations of titanium, aluminum and vanadium were found over a large area within the resolution limit (about 1 μm) in the heat-affected regions.

It can also be concluded from this that the principle for creation of the channel structure to be implemented in accordance with the invention is based on remelting and rapid solidification and not on any application.

Example 3: Treatment of a Round Wire Surface and Effect of the Laser Settings

Process Conditions/Parameters:
Material: round Ti6Al4V wire (supplier: mahe medical GmbH, Tuttlingen, Germany)
Laser: 100 W Nd: YAG laser (CL100 type from CleanLaser, Herzogenrath, Germany, with stamp optics and f(330) and f(160) f-theta lens)
Treatment of a round titanium wire (Ti6Al4V) having diameter 1 mm. The wire was rotated under the laser by 120° (in the case of laser parameter L2) or 60° (in the case of laser parameter L17), and the surface at the top in each case was treated with the laser. The scan direction was perpendicular to the wire height.

TABLE 1

| Parameter | Spot diameter at the focus mm | Fluence J/cm$^2$ | Power W | Pulse repetition frequency kHz | Pulse duration ns | Number of directly successive laser treatments per position | Pulse overlap in x direction (line overlap) mm | Pulse overlap in y direction (scan direction) Mm | Number of cycles |
|---|---|---|---|---|---|---|---|---|---|
| L2 | 0.107 | 5.39 | 100 | 200 | 200 | 20 | 0.107 | 0.0535 | 1 |
| L17 | 0.052 | 6.75 | 30 | 200 | 200 | 15 | 0.0026 | 0.0052 | 1 |

Analysis:
  Method: section preparation and characterization by optical microscopy
  Preparation: etching with a mixture of 97 ml of H2O and 3 ml of HF
  Section orientation: parallel to the direction in which the laser advances in the line (resulting in parallel alignment of the channels)
Result:
  The Ti6Al4V surfaces on round wires produced with the process parameters described have parallel channel structures analogous to the observations in example 1. The structure parameters such as pore depth and width and the opening diameter decrease with the use of a smaller focus diameter (parameter L17 compared to parameter L2).

Example 4: Loading of the Porous Surfaces

Process Conditions/Parameters:
  Material: 2 cm×2 cm flat Ti6Al4V substrate
  Laser: 100 W Nd: YAG laser (CL100 type from CleanLaser, Herzogenrath, Germany, with stamp optics and f(330) and f(160) f-theta lens)

TABLE 2

Parameters

| Parameter | Spot diameter at the focus mm | Fluence J/cm$^2$ | Power W | Pulse repetition frequency kHz | Pulse duration ns | Number of directly successive laser treatments per position | Pulse overlap in x direction (line overlap) mm | Pulse overlap in y direction (scan direction) mm | Number of cycles |
|---|---|---|---|---|---|---|---|---|---|
| L17 | 0.052 | 6.75 | 30 | 200 | 200 | 15 | 0.0026 | 0.0052 | 1 |
| L2 | 0.107 | 5.39 | 100 | 200 | 200 | 20 | 0.107 | 0.0535 | 1 |
| L301 | 0.107 | 7.05 | 100 | 150 | 180 | 20 | 0.107 | 0.0535 | 1 |

Analysis:
  Method: weighing of water-infiltrated surface structures
  Preparation: An about 10 µl droplet of water was pipetted onto the samples, then the surface was dried with a lint-free cloth. For this purpose, a Kimwipe cloth folded in 4 plies (Kimberly Clark 7552, Kimtech Science precision cloths) was pressed onto the surface for 5 seconds, then this was repeated with a new Kimwipe cloth. Subsequently, the increase in mass of the samples was determined with an analytical balance.
Result:
  The amount of water absorbed in the pores varies as a function of the laser focus diameter and the fluence introduced:

TABLE 3

Water absorption as a function of the laser parameters

| Laser parameter | Amount of water in mg/cm$^2$ |
|---|---|
| L17 | 0.5 |
| L2 | 1 |
| L301 | 2.5 |

Example 5: Improvement of Hydrophilic Properties

The surface energy can be adjusted in a controlled manner by means of coatings, including locally, for example within and outside the pores or channels.

Example: titanium dioxide (TiO$_2$) coating material

A titanium dioxide layer (TiO$_2$) is deposited by reactive sputtering of metallic titanium. The low-pressure reactor is evacuated to a base pressure of $1*10^{-5}$ mbar with the aid of a turbo/drag pump (520 l/s). Argon is subsequently admitted into the reactor at a flow rate of 120 sccm, such that a pressure of $5*10^{-3}$ mbar is established in the reactor. For free sputtering of the titanium target, a high-frequency plasma power (13.56 MHZ) of 2400 W is injected. The magnetron itself is flanged onto the reactor. After free sputtering for about one minute, 9 sccm of oxygen is additionally admitted into the reactor. This low oxygen flow ensures that the 250 mm round target is not poisoned and that titanium oxide is deposited on the substrate. After sputtering time of 10 minutes, a TiO$_2$ layer of thickness about 30 nm is deposited on the substrate.

Figure 7:
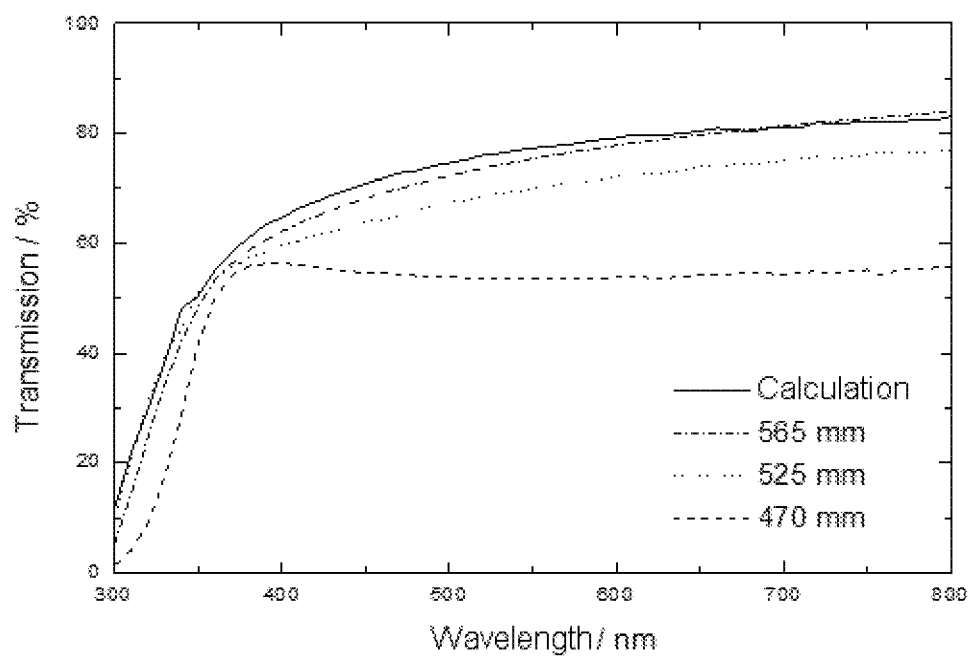
FIG. 7 shows transmission as a function of the substrate-titanium target distance.

For optimization of the chemical composition of the titanium dioxide, glass substrates were positioned at different points in the reactor, and the transmission of the titanium oxide layers was characterized. FIG. 7 shows transmission as a function of the substrate-titanium target distance. In the case of a distance of 470 mm, a distinct variance from the calculated transmission of pure TiO$_2$ is found because the titanium has not been fully oxidized to TiO$_2$. If the distance is increased to 565 mm, virtually pure TiO$_2$ is deposited on the substrate.

Before and after the coating of the substrate from example 1 with the hydrophilic titanium dioxide, distinctly different wetting characteristics are observed. The subsequent TiO$_2$ layer completely wets the sample surface, even if only a small portion of the sample touched any water surface. A very strong capillary effect occurs, which does not occur without TiO$_2$ coating.

Example 6: Improvement of Biocompatibility

Improvement of the biocompatible properties of the article of the invention is possible by subsequent coating with metallic titanium. Any toxic nanoparticles present are bound by the titanium layer, or the altered roughness of the surface results in a positive effect.

Example: titanium

Titanium is deposited by non-reactive sputtering in an argon atmosphere. For this purpose, the reaction chamber of size 50×50×50 cm (vacuum chamber) is evacuated to $1*10^{-5}$ mbar, and then 120 sccm of argon is admitted into the reactor. The pressure rises to $5*10^{-3}$ mbar. The sputtering output chosen is 2400 W. The distance between titanium target and substrate is 20 cm. After a processing time of 2 min, an about 100 mm-thick titanium layer has grown onto the substrate. The layer thickness can be ascertained by transmission spectroscopy if the calculated transmission spectrum of a Ti layer corresponds to the experimental spectrum.

A titanium layer applied to loose nanoparticles cannot improve biocompatibility. In the case of the metal substrate to be used in accordance with the invention from example 1, which likewise has a large number of nanoparticles on the surface, biocompatibility can be improved. This is attributed to the specific procedure of laser treatment, by means of which the nanoparticles are firmly attached and the titanium layer has good adhesion.

Example 7: Steel Treatment

Substrate: CrNi steel

It is found that: the greater the fluence, the greater the primary pore size, and the larger the heat-affected zone and change in microstructure.

Example 8: Steel as Substrate

Process Conditions/Parameters:
  Material: flat 1.4404 steel substrate
  Laser: 100 W Nd: YAG laser (CL100 type from Clean-Laser, Herzogenrath, Germany, with stamp optics and f(330) and f(160) f-theta lens)

TABLE 4

| Parameter | Spot diameter at the focus mm | Fluence J/cm² | Power W | Pulse repetition sequence kHz | Pulse duration ns | Number of directly successive laser treatments per position | Pulse overlap in x direction (line overlap) mm | Pulse overlap in y direction (scanning direction) mm | Number of cycles |
|---|---|---|---|---|---|---|---|---|---|
| L21 | 0.107 | 10 | 100 | 100 | 100 | 50 | 0.107 | 0.0535 | 1 |
| L22 | 0.107 | 7 | 100 | 150 | 180 | 50 | 0.107 | 0.0535 | 1 |
| L23 | 0.107 | 5 | 100 | 200 | 200 | 50 | 0.107 | 0.0535 | 1 |

Analysis:
  Method: section preparation and characterization by optical microscopy
  Preparation: etching with V2A etchant
  Section orientation: parallel to the direction in which the laser advances in the line (resulting in parallel alignment of the channels)
Result:
  The creation of the structures (channels) to be provided in accordance with the invention is reliably possible on steel surfaces. Depending on the laser fluence, the result is different dimensions with regard to pore depth and width, opening diameter and the heat-affected zone.

Example 9: Channels in Steel

The creation of fully or partly open channels on steel (1.4301) by means of the following parameters:
  Material: flat steel (1.4301) substrate,
  Laser: 100 W Nd: YAG laser (CL100 type from Clean-Laser, Herzogenrath, Germany, with stamp optics and f(330) f-theta lens)
  Wavelength emitted: 1064 nm
  Energy distribution in the laser spot: Gaussian profile
  Spot diameter at the focus: 107 µm
  Target power: 100% (100 W)
  Pulse repetition frequency: 150 kHz
  Pulse length: 180 ns
  Laser fluence at the substrate: 7 J/cm²
  Number of directly successive laser treatments per position: 20
  Number of repetitions of the complete laser treatment (number of cycles): 1
  Overlap in the advance between the individual laser positions: 25%
  Line overlap: 25%
  Line scan: parallel
Results:
  The parallel channels have a minimum depth of (100+/−40) µm, a width of (75+/−25) µm, and a length of 10 cm. The channels are partly open, with the opening width varying between less than 1 µm and 70+/−20 µm.

Example 10: Overlapping channels

By a higher line overlap in the laser scanning process (e.g. 75%), parallel channels with an overlapping cross section are formed:
  Material: flat Ti6Al4V substrate
  Laser: 100 W Nd: YAG laser (CL100 type from Clean-Laser, Herzogenrath, Germany, with stamp optics and f(330) f-theta lens)
  Wavelength emitted: 1064 nm
  Energy distribution in the laser spot: Gaussian profile
  Spot diameter at the focus: 107 µm
  Target power: 100% (100 W)
  Pulse repetition frequency: 100 kHz
  Pulse length: 129 ns
  Laser fluence at the substrate: 10.5 J/cm²
  Number of directly successive laser treatments per position: 20
  Number of repetitions of the complete laser treatment (number of cycles): 1
  Overlap in the advance between the individual laser positions: 75%
  Line overlap: 75%
  Line scan: parallel
  The parallel channels have a minimum depth of (400+−50) µm, a width of (250+−100) µm, and a length of greater than 10 cm. The channels are partly covered.

Example 11: Grain Size Distribution

The different grain size distributions in the first heat-affected zone, in the present example with an extent of the contact plane of 150 µm+/−50 µm, in the second heat-affected zone, in the present example with an extent of 25

μm, and the substrate were examined below (analogous sample production to example 1; see FIGS. 5a and 5b):

Material: flat Ti6Al4V substrate

Laser: 100 W Nd: YAG laser (CL100 type from Clean-Laser, Herzogenrath, Germany, with stamp optics and f(330) f-theta lens)

Wavelength emitted: 1064 nm

Energy distribution in the laser spot: Gaussian profile

Spot diameter at the focus: 107 μm

Target power: 100% (100 W)

Pulse repetition frequency: 200 kHz

Pulse length: 199 ns

Laser fluence at the substrate: 5.3 J/cm2

Number of directly successive laser treatments per position: 25

Number of repetitions of the complete laser treatment (number of cycles): 1

Overlap in the advance between the individual laser positions: 50%

Line overlap: 0%

Result (regions shown schematically in FIG. 4)

TABLE 5

Grain sizes

| Region | Average grain size | Grain size ratio |
| --- | --- | --- |
| 23. Opening region | 0.070 μm | Region 23. : Region 25. = 1:25 |
| 25. Region of the lowest point | 0.6 μm | Region 25. : Region 27. = 4:10 |
| 27. Substrate | 1.6 μm | |

Measured using a section at right angles to the contact plane. FIB preparation (focused ion beam; instrument: Helios 600, FEI; manufacturer: FEI, Hillsboro, Oregon, USA) of the regions. Dissemination of grain sizes by STEM (scanning transmission electron microscope; instrument: Tecnai TF-20 S-Twin G2; manufacturer: FEI, Hillsboro, Oregon, USA) and determination of the average diameter of the grains by determining the average grain diameter at the centroid of the grains.

Example 12: Antibacterial Coating

An antibacterial coating having a high absorption capacity for various active ingredients was to be developed. The active ingredient is to be introduced by simply dipping the coated implant into an active ingredient solution. The release of the laden coating is to be in the region of 30 min. What is crucial, however, is that the active ingredients is released in large doses immediately after the insertion of the implant.

The literature discloses various approaches for storage layers with release function. Particular attention is paid here to titanium dioxide nanotubes that can be produced by simple anodization and provide a large reservoir for active ingredients. However, the long loading times are disadvantageous. According to the exact type of nanotubes, up to five loading cycles per hour are required.

Profile Requirements:

Rapid loading by dip-coating

Rapid release

Absorption capacity of min. 160 μm of gentamicin sulfate per cm2 of implant surface area Since gentamicin is difficult to detect optically, methylene blue dye was chosen as replacement active ingredient. In order to determine the release time and absorption capacity, a UV/Vis spectrometer from OptikJena was used.

Loading:

The laser-structured sample of size 2×2 $cm^2$ is immersed into a concentrated methylene blue solution (30 mg/ml) for 5 min. Subsequently, the reverse side and the four edges are wiped with a paper towel. The sample surface itself is dabbed with a paper towel until no further dye emerges from the surface.

Measurement:

Into a cuvette filled with saline (0.9 percent by weight of NaCl in water) and having a base area of 2.5×2.5 $cm^2$ is placed the reference beam and the sample beam of the UV/Vis spectrometer. Subsequently, the methylene blue-laden sample is introduced into the cuvette in the sample beam. The sample beam here is aligned such that it hits the cuvette 2 mm above the sample surface. Absorption at 620 nm is measured every second. This measurement ends after a time of half an hour.

Figure 8:
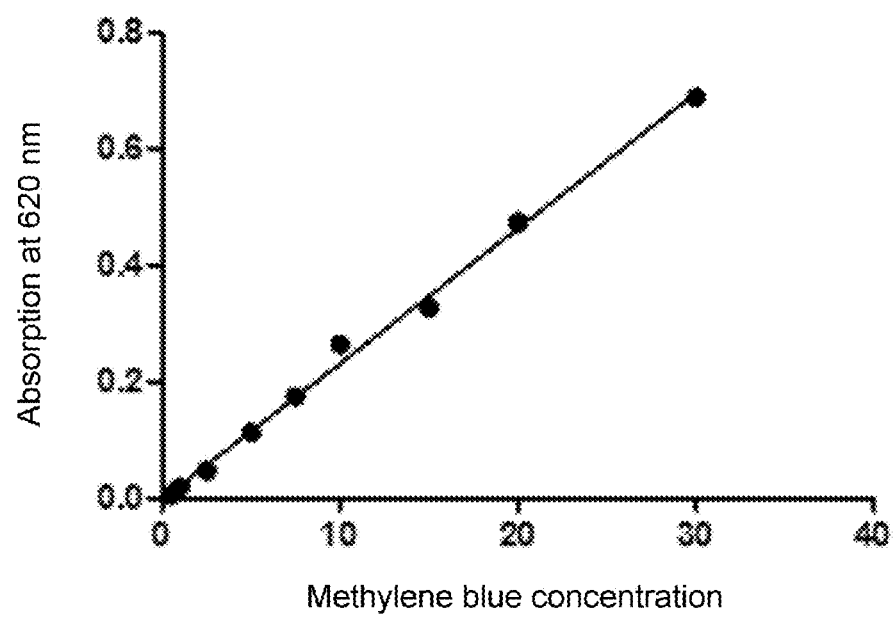
FIG. 8 shows absorptions plotted against methylene blue concentrations.
Figure 9:
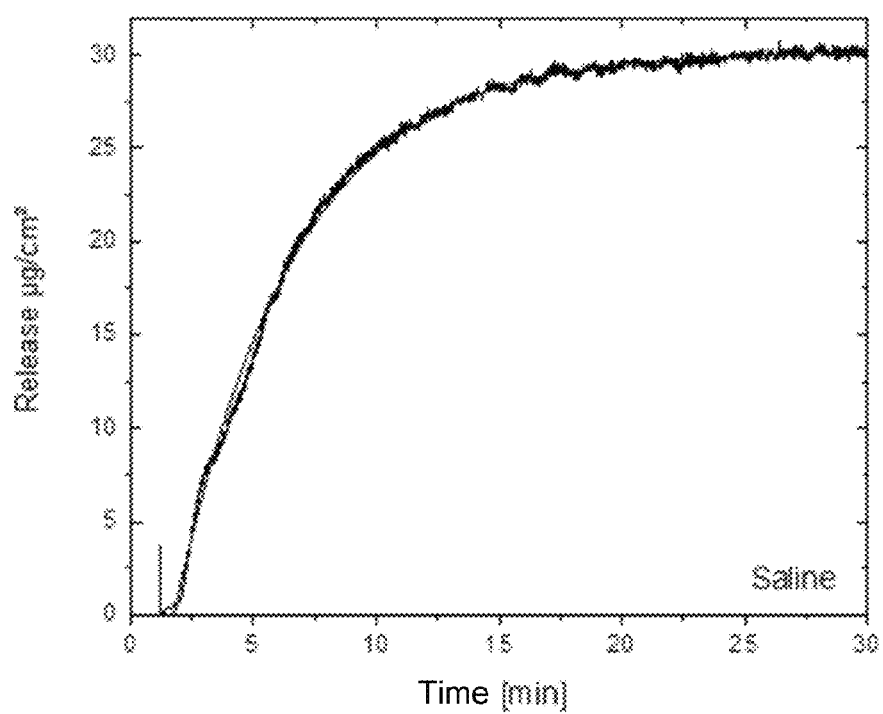
FIG. 9 shows the amount of methylene blue released as a function of time.

In order to correlate absorption A with a concentration c, a calibration curve must be recorded. Solutions with known methylene blue concentrations are produced (2.5 μg/ml, 5 μg/ml, 7.5 g/ml, 10 μg/ml, 15 μg/ml, 20 μg/ml, 30 μg/ml). The absorptions ascertained are plotted against the concentrations (FIG. 8). The resultant straight line is subjected to a linear fit. With a sample produced identically to example 1, the calibration line shown in FIG. 8, after conversion of the absorption units to concentration values per $cm^2$ of sample area, results in the curve progression of the amount of methylene blue released as a function of time which is shown in FIG. 9.

Example 13: Chemical Composition of the Laser-Treated Surface

For characterization of the chemical composition of the substrate surface after laser treatment, measurements were conducted by means of x-ray photoelectron spectroscopy (XPS). As well as a measurement directly at the substrate surface, lower-lying changes were also characterized. For this purpose, 2.8 μm of the surface was removed by means of an argon ion beam (see below). Within the scope of the detection limit, only purely metallic titanium was detectable in the XPS fine spectrum (binding energy of the Ti $2p^{3/2}$ peak at 453.43 eV in the XPS system used).

Material:
  Material: flat Ti6Al4V substrate (supplier: Rocholl GmbH, Aglasterhausen, Germany)
Laser Parameters:

TABLE 6

| Parameter | Spot diameter at the focus mm | Fluence J/cm² | Power W | Pulse repetition frequency kHz | Pulse duration ns | Number of directly successive laser treatments per position | Pulse overlap in x direction (line overlap) mm | Pulse overlap in y direction (scan direction) mm | Number of cycles |
|---|---|---|---|---|---|---|---|---|---|
| L2 | 0.107 | 5.39 | 100 | 200 | 200 | 20 | 0.107 | 0.0535 | 1 |

Analysis:
  The XPS analyses were effected with a Thermo K-Alpha K1102 system with an upstream argon glovebox for the handling of air-sensitive samples.
Measurement Parameters:
  Take-off angle of the photoelectrons 0°
  Monochromatized Al Kα excitation
  Constant analyzer energy mode (CAE) with pass energy 150 eV in overview spectra and 40 eV in highly energetically resolved line spectra
  Analysis area: 0.40 mm Ø
  The uppermost layer was removed using an argon ion sputtering source. The sputtering rate was 0.8 nm/s, the sputtering time 3500 s (total layer removal 2.8 μm).

TABLE 7

Summary of the results:

| | C (at %) | O (at %) | Ti (at %) | Al (at %) | V (at %) | N (at %) | Si (at %) | Mg (at %) | Ca (at %) | Zn (at %) | S (at %) |
|---|---|---|---|---|---|---|---|---|---|---|---|
| Ti6Al4V reference, surface | 27.2 | 43.9 | 20.2 | 3.4 | 0.3 | 2.2 | 0.5 | 0.3 | 1.4 | 0.2 | 0.5 |
| Ti6Al4V reference, after material removal | 3.2 | 3.8 | 76.9 | 11.0 | 3.8 | 1.3 | — | — | — | — | — |
| Ti6Al4V L2, surface | 19.8 | 52.1 | 21.5 | 4.9 | 1.2 | 0.6 | — | — | — | — | — |
| Ti6Al4V L2, after material removal | — | 20.5 | 57.9 | 2.3 | 1.1 | 18.1 | — | — | — | — | — |

Description of the XPS Results:
  Directly at the surface, the XPS measurements show purification of the Ti6Al4V by the laser treatment. There is both a reduction in the carbon content and removal of the small amounts of Si, Mg, Ca, Zn and S. Additionally apparent is an increase in the oxygen content at the surface (formation of titanium oxide).

After the removal of material (2.8 μm) down to a substrate depth at which only pure metallic titanium is apparent in the fine Ti spectrum, the measurement of the laser-treated surface shows a distinctly increased proportion of oxygen and nitrogen compared to the untreated reference. Without being bound to a theory, these elements obviously do not appear to be present bound to the titanium since the fine titanium spectrum does not show any indications of titanium oxide or nitride. The enrichment of oxygen and/or nitrogen in regions beneath the surface in which is the titanium is detectable by means of XPS only in pure metallic form is characteristic of the laser treatment described in the present patent on titanium or titanium alloys.

Example 14: Cell Growth Characteristics (Biocompatibility)

A Ti6Al4V surface was to be created on a K-wire, said surface having good ability to facilitate the growth of cells on and into it. For this purpose, a channel structure according to the invention was produced with the aid of laser methodology and the surface was provided with a sputtering layer of titanium dioxide. The latter may (generally with preference in accordance with the invention) include firmly embedded silver particles in order to achieve an additional antibacterial effect. The cell characteristics were tested with MG-63 osteoblasts, followed by preparation of the cell-covered surface for characterization in a scanning electron microscope.
  It is known from the literature that smooth Ti6Al4V surfaces have only weak ability to facilitate the growth of osteoblasts. However, the latter is found to be necessary for stable osseointegration of an implant.
Material Used:
  Round wire (K-wire) Ti6Al4V with diameter 1 mm (supplier: mahe medical GmbH, Tuttlingen, Germany)
Laser Treatment:
  Laser: 100 W Nd: YAG laser (CL100 type from CleanLaser, Herzogenrath, Germany, with stamp optics and f(330) f-theta lens).
  The laser treatment was effected with parameter L2 from table 6.
  For this purpose, the wire was rotated under the laser in three steps by 120° each time, and the surface at the top in each case was treated with the laser. The scan direction was at right angles to the longitudinal wire direction.

Plasma Coating:

The titanium dioxide layer (TiO$_2$) was deposited by reactive sputtering of metallic titanium. A low-pressure reactor having a volume of 125 l is evacuated with the aid of a turbo/drag pump (520 l/s) to a base pressure of $1*10^{-5}$ mbar. Argon is subsequently admitted into the reactor at a flow rate of 120 sccm, such that a pressure of $8*10^{-3}$ mbar is established in the reactor. For free sputtering of the titanium target, a high-frequency plasma output (13.56 MHZ) of 2400 W is injected. The magnetron itself is flanged onto the reactor. After free sputtering for about one minute, 9 sccm of oxygen is additionally admitted into the reactor. This low oxygen flow ensures that the 250 mm round target is not poisoned, and that titanium oxide is deposited on the substrate. After a sputtering time of 10 min, an about 30 nm-thick TiO$_2$ layer is deposited on the substrate.

Before and after the coating with the hydrophilic titanium dioxide, distinctly different wetting characteristics are observed. The subsequent TiO$_2$ layer completely wets the sample surface, even if only a small portion of the sample is in contact with a water surface. A very strong capillary effect occurs, which does not exist without TiO$_2$ coating.

Testing of Cell Adhesion:
  I. Preparation: In a first step, the laser-treated and coated K-wires were cleaned with isopropanol. Subsequently, a section of the K-wire was introduced into a sterile 6-well microtiter plate.
  II. Cell colonization and fixing: 2 ml of MG-63 cells (86051601 Sigma, Passage 06) were sown onto the K-wire in a concentration of $1\times10^6$ cells/mL and incubated at 37° C., 5% CO$_2$, for 24 h. After the incubation, the medium was removed and the cells were washed 2× with 2 ml of phosphate-buffered salt solution (PBS) for 2 min. The PBS was removed and replaced with 2 ml of glutaraldehyde solution (2.5% in H$_2$O, w/v), and incubated at 37° C. for 30 min. The glutaraldehyde was removed and the cells were washed 3× with 2 ml of PBS for 10 min
  III. Ethanol treatment: The cells were treated with rising ethanol concentration. The cells were respectively incubated for 10 min with 30%, 50%, 70%, 80%, 90%, and 2×100% ethanol (in ddH2O, v/v) at room temperature (RT).
  IV. Dehydrogenation: HMDS (hexamethyldisilazane) was mixed 1:1 with 100% (v/v) ethanol, 2 ml was added to the cells and incubation was effected at RT for 30 min. Subsequently, the solution was replaced with 100% HMDS (v/v) and incubation was effected again at RT for 30 min. After the incubation, the solution was removed and the samples were dried at RT overnight.
  V. Characterization of the samples by means of SEM: The K-wires were subsequently fixed to a sample holder and introduced into an SEM (model: Phenom XL from Thermo Fisher). Imaging was effected in secondary electron mode (SE mode).

Observation:

The biocompatibility of the coating, associated with the undercut trench structure of the invention, enables adhesion of osteoblasts on the surface and colonization of the surface therewith. The SEM image of the correspondingly treated surface shows successful colonization with osteoblasts. Above, between and in the distortions of the laser structure, a multitude of osteoblasts are apparent, which spread over the surface and grow into the depressions and also partly cover them. The dense cell network formed suggests high affinity of the cells for adhesion to and proliferation on the surface, and their characteristic spreading form shows good vitality of the osteoblasts. This ability to facilitate cell growth and cell intergrowth is considered to be a basis for stable osseointegration.

Figure 10:
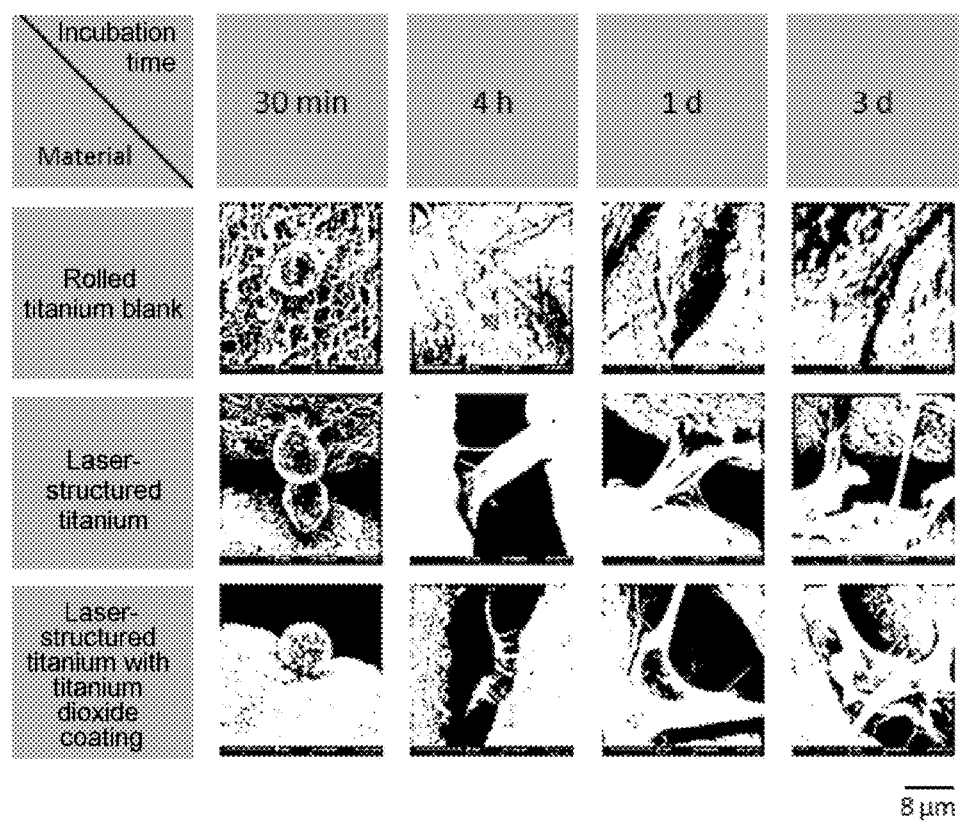
FIG. 10 shows SEM images of osteoblasts on titanium surfaces of roll blanks and on those of the invention at different times.

FIG. 10 shows SEM images of osteoblasts on titanium surfaces of roll blanks and on those of the invention at different times.

After incubation for thirty minutes, the cells at first show a spherical shape and individual philopodia point from the centroid of the cell mass in the surface direction. After four hours of incubation, the philopodia point in all directions. On the surface of the invention, the cells bridge the trenches. After a few days, growth of the philopodia into the undercut trench structures is observed. The cells have a flat appearance on the bare reference sheets, but have no means of migrating into the material structures. The laser structures of the invention with and without additional titanium dioxide coating do not show any optical differences in the morphology of the colonizing cells.

It is found that, in general, a preferred use of the substrate of the invention is use as an implant, more preferably after coating with a coating that improves biocompatibility, especially with titanium dioxide.

Example 15: Adhesive bonds

Lasered and non-lasered stainless steel samples (AISI 316L; MNo. 1.4404) are bonded, and the bond is tested by a lap shear test. The influence of a laser-induced trench structure on the strength of the bond is tested.

Material Used:

316L sheet stainless steel; sample sizes: 100 mm×25 mm

Laser Treatment:

Two different laser parameters were applied to 10 samples in each case, these being listed in the table below (table 9). The laser treatment was effected only locally on the sample sheets (area to be bonded at one end of the sheet with a length of 19 mm over the complete sample width).

Laser: 100 W Nd: YAG laser (CL100 type from CleanLaser, Herzogenrath, Germany with stamp optics and f(330) f-theta lens).

Energy distribution in the laser spot: Gaussian

Spot diameter at the focus: 107 μm

The laser optics and the samples to be treated were in a laser protection cell (aluminum) with suction. For avoidance of particle redepositions, the samples were additionally purged during the laser treatment with a compressed air stream of 45 l (STP)/min (inlet pressure 8 bar; 20° C.) with the aid of a compressed air nozzle (mounted at an angle of 45°; directed directly onto the samples).

TABLE 8

Laser parameters for the bonding tests with Araldite 2011

| Parameter | Spot diameter at the focus mm | Fluence (individual pluse) J/cm² | Power W | Pulse repetition frequency kHz | Pulse duration ns | Number of of directly successive laser treatments per position | Pulse overlap in x direction (line overlap) μm | Pulse overlap in y direction (scanning direction) μm | Number of cycles |
|---|---|---|---|---|---|---|---|---|---|
| L1 | 0.107 | 10.6 | 100 | 100 | 100 | 20 | 160.5 | 53.5 | 1 |
| L5 | 0.107 | 10.6 | 100 | 100 | 100 | 15 | 160.5 | 53.5 | 1 |

In addition, microscope images of the samples after laser treatment were created. Both show the undercut trench structures of the invention. The surface after the laser treatment L1, by comparison with L5, shows somewhat broader lines and a higher number of crosslinks. By comparison, L5 is more open and finer in terms of its trench width.

Adhesive Bonds:

Test method: lap shear test according to DIN EN 1465 (testing room not climate-controlled)
 Adhesive: Araldite 2011
 Curing: 24 hours at RT+30 min at 80° C.
 Bond area: about 12.5 mm×25 mm The adhesive was applied to one of the two sheets. Subsequently, the second test sheet was placed on top, and the bonded region was subjected to a contact weight of 500 g. In order to prevent tilting of the samples during the loading with the weight, washers of appropriate size were pushed under the upper sample. After curing, the specimens were tested in accordance with the specifications in DIN EN 1465:

Test system: Zwick BT1-FB020TN.D30
 Force transducer: 20 kN
 Testing speed: 10 mm/min The references used were untreated and wet-chemically pretreated (treatment in an ultrasound bath, 10 min, room temperature, isopropanol/water mixture in a volume ratio of 9:1) sheets. 5 untreated, 5 wet-chemically treated, 5 L1-treated and 5 L5-treated test specimens were produced in this way.

Results:

The results of the individual measurements (5 samples per condition) were used to form an average. A collation of the lap shear strengths together with the corresponding standard deviation can be found in FIG. 11.

Figure 11:
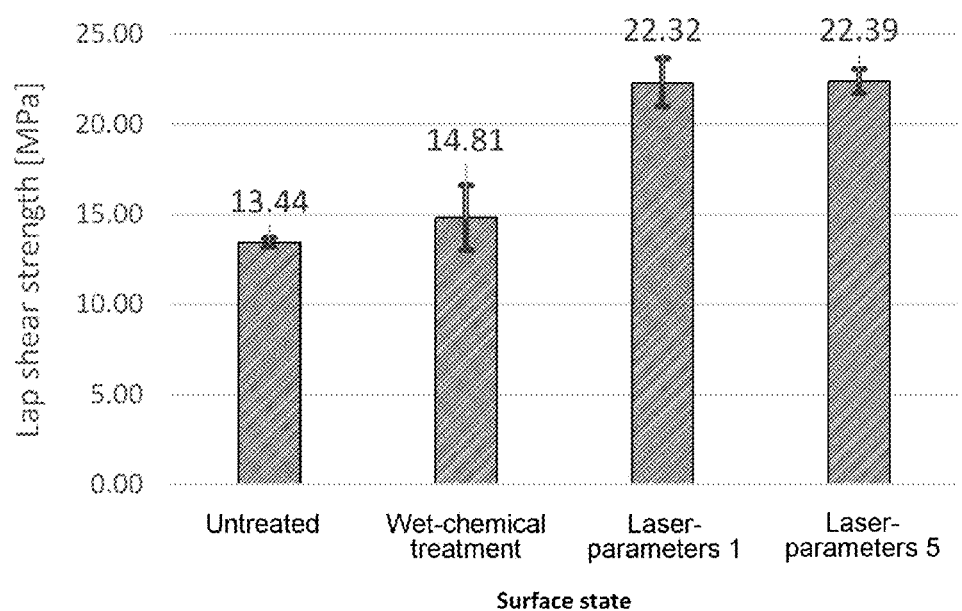
FIG. 11 shows the lap shear strengths for different surface states.

FIG. 11 shows the lap shear strengths after bonding with Araldite 2011.

What is apparent is a distinct increase in lap shear strength as a result of the laser treatment (both with L1 and with L5) compared to the untreated or wet-chemically pretreated samples. In addition, the untreated and wet-chemically pretreated samples have complete adhesive failure at the interface with steel. The laser-treated samples have complete cohesive failure within the adhesive.

It can be inferred from this that inventive use of the substrates of the invention serves to improve bonding capacity compared to untreated substrates.

Example 16: Filling of the Structures with Tricalcium Phosphate (TCP)

TCP is metabolized by living cells and therefore serves as nutrient medium and for improving the growth of cells onto surfaces. However, a prerequisite for use in the medical sector is good binding of the TCP layer on the respective surface. In the case of rough surface structures, there is additionally the possibility of growth of the tissue into the TCP-filled cavities.

Material Used:

316L stainless steel sheet; sample dimensions: 20 mm×20 mm

Laser Treatment:

Three samples per test were treated with a laser parameter listed in the table below (table 10). The laser treatment took place over the full area of the sample sheets.

Laser: 100 W Nd: YAG laser (CL100 type from Clean-Laser, Herzogenrath, Germany with stamp optics and f(330) f-theta lens).

Energy distribution in the laser spot: Gaussian
Spot diameter at the focus: 107 μm The laser optics and the samples to be treated were in a laser protection cell (aluminum) with extraction. For avoidance of particle redeposition, the samples were additionally purged during the laser treatment with a compressed air stream of 45.7 l (STP)/min (inlet pressure 8 bar; 20° C.) with the aid of a compressed air nozzle (mounted at an angle of 45°; directed directly onto the samples).

TABLE 9

Laser parameters for the fixing of tricalcium phosphate

| Parameter | Spot diameter at the focus mm | Fluence (single pluse) J/cm² | Power W | Pulse repetition frequency kHz | Pulse duration ns | Number of of directly successive laser treatments per position | Pulse overlap in x direction (line overlap) μm | Pulse overlap in y direction (scanning direction) μm | Number of cycles |
|---|---|---|---|---|---|---|---|---|---|
| L1 | 0.107 | 10.6 | 100 | 100 | 100 | 20 | 160.5 | 53.5 | 1 |

The parameter corresponds to the laser parameter L1 from example 15. The microscope image shows the undercut trench structure of the invention.

Filling with Tricalcium Phosphate:

The filling of the laser structures produced above was effected in a dipping process into a dispersion containing TCP nanoparticles:

Dispersion: 20.2% by weight of TCP in ethanol

TCP: CA-PAT-01-NP (from American Elements, Los Angeles, USA).

Production of the suspension: After the TCP has been added to the ethanol, the suspension is mixed for 10 minutes with the aid of a magnetic stirrer (at room temperature) and then introduced into an ultrasound bath in a closed beaker at room temperature for 10 min. The filling of the surface structure with the aid of the dipping process is effected as soon as possible after the ultrasound bath (model: Ultrasonic 300TH, from VWR), in order to avoid reagglomeration or sedimentation of the nanoparticles.

Filling: The freshly mixed suspensions are introduced into a flat glass dish. Enough of the suspension has to be introduced for the sample to be completely covered therewith. The samples are then introduced into the suspension with tweezers and left therein for 30 s. They are likewise removed with the aid of tweezers. During the entire process, the samples must be in a horizontal position. The samples are dried under an air atmosphere for 10 min. For better fixing of the TCP, a sintering process is effected in protective gas atmosphere (argon) in a high-temperature oven (model: 16-6, from H. Dieckmann). The sintering process is effected with a heating and cooling rate of 30 K/min and with a hold for 1 minute at the final temperature of 1050° C.

Results:

The filling of the laser structure of the invention with TCP leads to primary intercalation of the TCP in the depressions of the laser structure. A network of cracks in the TCP is apparent under relatively high enlargement, which results from the densification of the particles during the sintering. The intercalation and anchoring of the TCP in the trench structure can also be shown by means of gravimetric measurements (FIG. 12).

Figure 12:
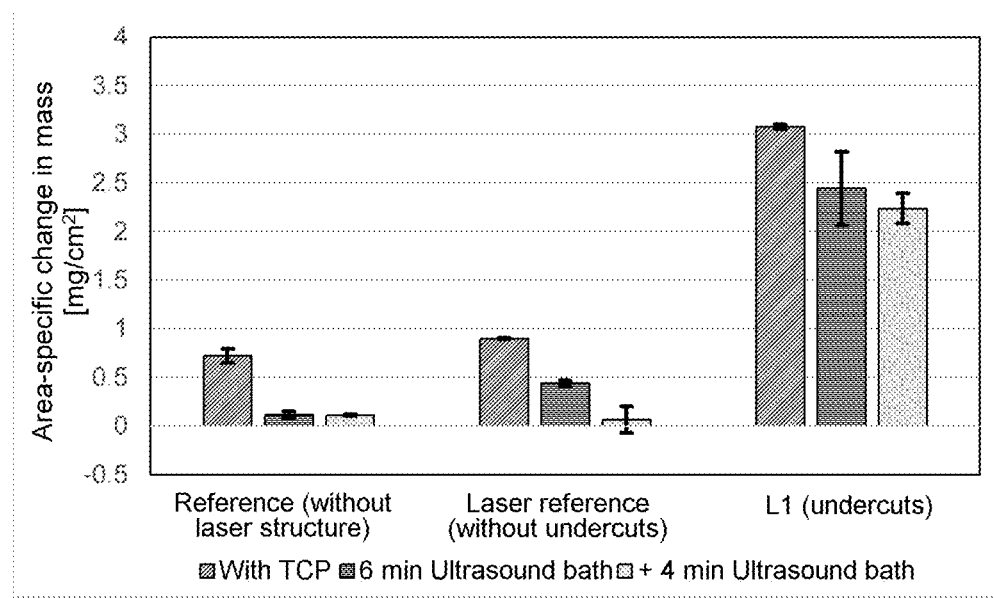
FIG. 12 shows the area-specific change in mass of an unstructured sheet, of a non-undercut laser structure, and of a steel surface that has been lasered with L1 and filled with TCP.

FIG. 12 shows the area-specific change in mass of an unstructured sheet, of a non-undercut laser structure, and of a steel surface that has been lasered with L1 and filled with TCP. Diagonal stripes: after filling and sintering; horizontal line: after ultrasound bath for 6 min; dots: after ultrasound bath for a further 4 min. What are shown are the averages and the standard deviation calculated from three individual measurements.

For this purpose, an analytical balance (model: ME235S; from Sartorius) was used. The comparison used in this case was an unstructured sample in the state as supplied and a non-undercut laser structure (likewise trenches) with similar dimensions to those in the case of L1. The strength of the TCP anchoring was determined by introducing the samples into isopropanol after the filling and sintering process and treating them for 6 min or a further 4 min (total treatment time 10 min) in an ultrasound tank at room temperature. Subsequently, the mass of the samples was determined again. FIG. 12 shows the area-specific change in mass in relation to the mass of the lasered or unlasered and unfilled surface. It is clearly apparent that, in the case of the undercut laser structure of the invention, the amount of TCP initially absorbed is much higher than in the case of a non-undercut or unstructured reference surface. The latter also lose almost the entire amount of TCP after 10 min in the ultrasound bath. The structure of the invention thus leads to a distinctly better bound TCP layer at the surface.

Example 17: Stabilization of (Super)Hydrophobic Surface Properties

Superhydrophobic surfaces are used, for example, for implementation of an easy-to-clean effect. A characteristic feature of such a surface is a micro- and/or nanostructured topography. A possible route to the implementation of such a surface is a thin plasma-polymeric coating which, given suitable choice of the process parameters, leads to a structured surface. However, as a result of the extremely fine structures superhydrophobic surfaces are generally sensitive to abrasion. A test is conducted as to the extent to which these properties can be stabilized by application to a surface that has been macroscopically structured by laser.

Material Used:

Al99.5; sample dimensions: 100 mm×50 mm

Laser Treatment:

One sample having the parameters listed in table 11 per laser-treated variant was treated over its entire surface.

Laser: 100 W Nd: YAG laser (CL100 type from Clean-Laser, Herzogenrath, Germany with stamp optics and f(330) f-theta lens).

Energy distribution in the laser spot: Gaussian

Spot diameter at the focus: 107 µm

The laser optics and the samples to be treated were in a laser protection cell (aluminum) with extraction. For avoidance of particle redeposition, the samples were additionally purged during the laser treatment with a compressed air stream of 45.7 l (STP)/min (inlet pressure 8 bar; 20° C.) with the aid of a compressed air nozzle (mounted at an angle of 45°; directed directly onto the samples).

TABLE 10

Laser parameters for stabilization of a superhydrophobic plasma coating

| Parameter | Spot diameter at the focus mm | Fluence (single pluse) J/cm² | Power W | Pulse repetition frequency kHz | Pulse duration ns | Number of directly successive laser treatments per position | Pulse overlap in x direction (line overlap) µm | Pulse overlap in y direction (scanning direction) µm | Number of cycles |
| --- | --- | --- | --- | --- | --- | --- | --- | --- | --- |
| L14 | 0.107 | 10.6 | 100 | 100 | 100 | 18 | 214.0 | 53.5 | 1 |

Figure 13:
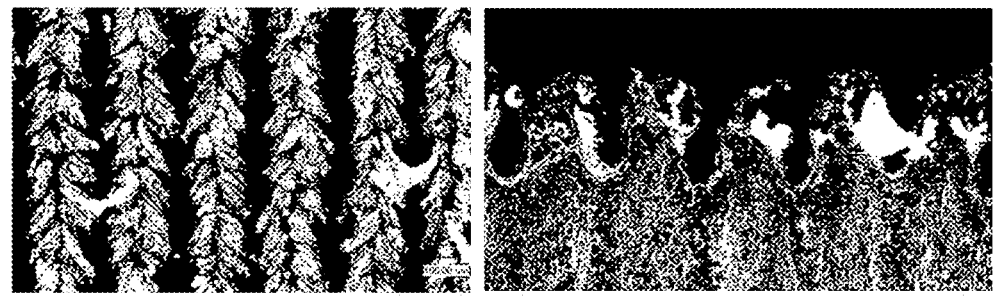
FIG. 13 shows microscope images of a surface structure produced by means of L14 in top view (on the left) and in side view (on the right)

The treatment of the Al99.5 surface leads to a surface structure of the invention with parallel undercut channels. FIG. 13 shows microscope images of the surface structure produced in this way.

FIG. 13 shows microscope images of a surface structure produced by means of L14 in top view (on the left) and in side view (on the right).

Plasma Treatment:

Both the unlasered and the lasered sample surfaces were subsequently coated with an industrial atmospheric pressure plasma source. The coating was effected with the plant technology specified hereinafter and the process parameters described in table 12. The complete coating process consists of three individual steps that were applied with ascending numerical sequence:

Plasma source: PFW10 (manufacturer: Plasmatreat, Steinhagen)

Generator type: FG5001 (manufacturer: Plasmatreat, Steinhagen) Transformer: HTR12 (manufacturer: Plasmatreat, Steinhagen)

Nozzle head set: IFAM type 21837 (WO20000EP02401) (for step 1 and step 2); IFAM type 24570 (WO20000EP02401) (for step 3)

TABLE 11

Plasma parameters for the production of a superhydrophobic surface coating

| Step | Frequency/ PP kHz | Pulse pause/ PP % | Voltage W | Line spacing mm | Nozzle distance mm | Speed m/min | Cycles | Flow rate/ process gas l/min/— | Precursor type | Precursor feed rate g/h | Precursor carrier gas (nitrogen) l/min | Precursor evaporator temperature ° C. |
|---|---|---|---|---|---|---|---|---|---|---|---|---|
| P1 | 19 | 100 | 300 | 4 | 8 | 20 | 1 | 30 / DL | | | | |
| P2 | 19 | 100 | 300 | 4 | 8 | 20 | 1 | 30 / DL | HMDSO | 36 | 2 | 100 |
| P3 | 19 | 100 | 300 | 4 | 8 | 40 | 1 | 30 / N$_2$ | HMDSO | 24 | 2 | 100 |

After the plasma coating, the samples were stored at room temperature for at least 6 h before further testing.

Abrasion Tests:

Abrasion resistance was tested with a TQC measurement system (model: Abrasion Tester). This was done by rubbing the surface with a die having a test cloth secured thereon at defined load and speed. Testing was effected using the following parameters: Test medium: ISO Crocking Cloth (manufacturer: James Heal; according to ISO 105-F09)

Weight: 500 g
Cycles: 10 or 20
Speed: 65 cycles/minute

Contact Angle Measurements:

Both laser-structured and coated and unstructured and coated Al99.5 samples were analyzed with the aid of a contact angle measuring instrument. Separate specimens were in each case used here for the measurements without abrasion and after 10 or 20 cycles in the abrasion test. The wetting medium used was distilled water. The measurements were effected with a Dataphysics OCA 50, a fully automatic contact angle measuring instrument with contour analysis system in accordance with DIN 55660-2. 6 µl water droplets were applied at a volume flow rate of 12 µl/min, and the advancing contact angle was measured.

Figure 14:
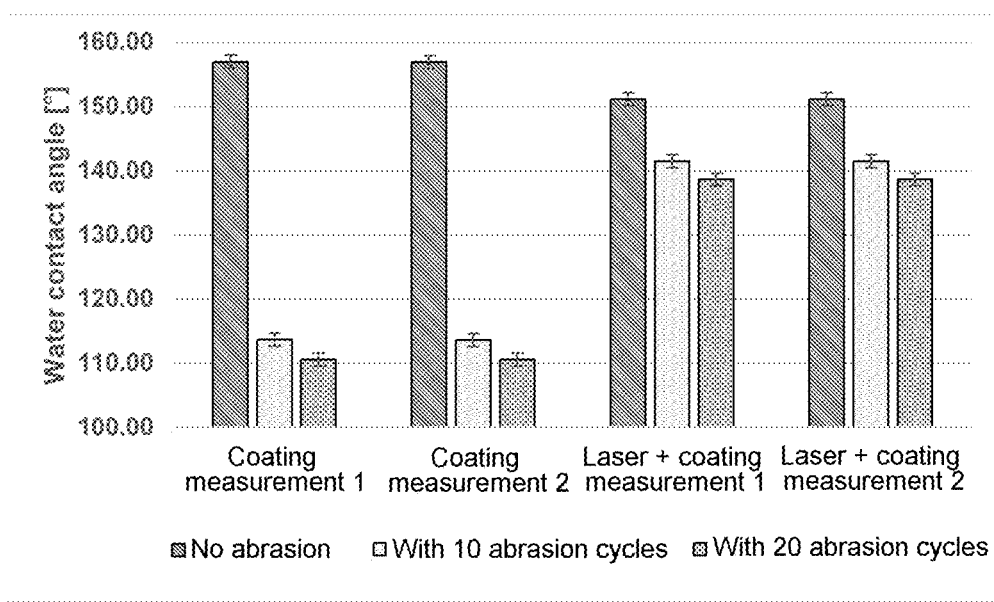
FIG. 14 shows the water contact angle of a plasma-polymeric coating on a laser-structured Al99.5 surface (on the right; L14) and an unstructured Al99.5 surface (on the left), before and after an abrasion test with 10 or 20 cycles.

Result:

FIG. 14 shows the water contact angle of a plasma-polymeric coating on a laser-structured Al99.5 surface (on the right; L14) and an unstructured Al99.5 surface (on the left), before and after an abrasion test with 10 or 20 cycles. Two separate measurement series were conducted on each surface.

For the measurements without abrasion, FIG. 14 shows a water contact angle of about 157° for the surface without structuring and about 151° for the sample structured by means of L14. It should be noted at this point that such high contact angles can no longer be measured with sufficient accuracy to be able to make a fully quantitative conclusion. However, the level of the contact angles measured clearly shows the superhydrophobic properties of the coating. By contrast, contact angle measurement on a purely laser-treated surface shows complete wetting of the water droplet (no contact angle measurable) and hence superhydrophilic wetting characteristics.

The defined abrasion of the surface with a crocking cloth, as described above, leads to a distinct reduction in the water contact angle to about 114° even after 10 cycles in the case of the unstructured surface, and hence also to a decline in the superhydrophobic properties. This trend continues after 20 cycles to a lesser degree. By contrast, by means of the combination of L14 with the plasma-polymeric coating, an average contact angle of 141.5° is still detectable after 10 abrasion cycles. This too decreases once again slightly (to) 138.6° after 20 cycles of abrasion, but is still much higher than in the case of the unstructured surface. This effect is attributable to the mechanical stabilization of the coating resulting from the embedding into the channel structure of the invention since mechanical abrasion can take place only at the peaks of the structures.

By comparison, a non-undercut laser structure in combination with an identical plasma coating after 10 abrasion cycles already shows a contact angle of 137° (with a starting value without abrasion of) 150°. The coating on an undercut laser structure of the invention therefore has higher stability to abrasion than a non-undercut structure.

Accordingly, it is preferable in accordance with the invention to use a substrate of the invention for stabilization of coatings applied thereto or properties thereof, compared to a substrate not having the structuring of the invention. This is especially true of hydrophobic properties, very particularly of superhydrophobic properties and/or easy-to-clean properties.

Example 18: Biological Functionalization of Surfaces

Biological functionalization of laser-structured titanium steel and stainless steel The aim of development is to produce biocompatible, laser-structured titanium steel and stainless steel surfaces that can be modified with vital, metabolically active cells in order thus to generate functionalization of the biological/technical system that would not be achievable with the organism or the material alone. The introduction of the biological material is to be effected by inoculating with a suspension composed of cells and nutrient solution, and is implemented through the capillary effect. Subsequent cell growth ensures spread of the cells over the full area in the capillary system of the laser-structured materials and on the surface. Colonization in the capillary system protects the cells from mechanical abrasion, such that the system can regenerate in such cases and can again produce a biofilm/ mycelium on the surface. The biofilm/mycelium hydrophobizes starting materials and generates a lubricant film on the surface that is stable under atmospheric conditions. Genetic alterations in the bacterium used provide for fluorescence of vital cells, such that process monitoring can take place.

In literature, the focus has to date been more on the avoidance of biological growth on metallic surfaces. Biofilm formation in the case of bacteria depends to a crucial degree on the factors of roughness, surface topography, hydrophobicity and surface charge. In the case of fungi, by contrast, sufficient availability of nutrients is the prerequisite for growth. The results are quite heterogeneous, and have species-specific differences in colonization characteristics for different structuring. The technique employed, by contrast, can produce surfaces that permit colonization by a wide variety of taxa (fungi, bacteria).

Profile of Requirements:
  Rapid loading through capillarity.
  Rapid growth rates of the organisms used
  Biofilm formation with prolonged stability under atmospheric conditions
  Autofluorescence for process monitoring
  Spread of the organisms over a large area in the laser-structured habitat Materials:
  Steel: 1.4301, 1 mm-thick sheet
  Titanium: Ti6Al4V, 1 mm-thick sheet Laser Treatment:
  Laser: 100 W Nd: YAG laser (CL100 type from CleanLaser, Herzogenrath, Germany with stamp optics and f(330) f-theta lens).

The laser treatment was effected with the parameters from table 13.

TABLE 13

Laser parameters for biological functionalization

| Parameter | Spot diameter at the focus mm | Fluence (single pluse) J/cm² | Power W | Pulse repetition frequency kHz | Pulse duration ns | Number of of directly successive laser treatments per position | Pulse overlap in x direction (line overlap) μm | Pulse overlap in y direction (scanning direction) μm | Number of cycles |
|---|---|---|---|---|---|---|---|---|---|
| L2 | 0.107 | 5.4 | 100 | 200 | 200 | 20 | 107 | 53.5 | 1 |
| L11 | 0.107 | 7.0 | 100 | 150 | 180 | 20 | 107 | 53.5 | 1 |
| L12 | 0.107 | 7.0 | 100 | 150 | 200 | 30 | 107 | 53.5 | 1 |

Culture:
  The bacterium *Pseudomonas fluorescens* is used (DSM No. 50090). This is a gram-negative, oxidase-positive, rod-shaped bacterium having a polar flagellum. In addition, the application has been conducted with the anamorphous fungus *Penicillium simplicissimum* (DSM No. 1078).

Method:
  For assessment of successful loading of the laser-structured cavities and for assurance of biological compatibility, detections were undertaken with fluorescent dyes (DAPI for *Pseudomonas fluorescens*, acridine orange for *Penicillium simplicissimum*).

The vitality of the cells was detected by means of a living/dead stain (SYTO 9 dye and propidium iodide, green=living cells, red=dead cells). The techniques mentioned can also be used to detect and assess the spread of the organisms over a large area in the laser-structured habitat. In addition, genetic modifications (transformation according to Hanahan, 1983 and Mandel and Higa, 1970; CaCl2) method) were undertaken on the *Pseudomonas fluorescens* bacterium in order to cause autofluorescence, which is used for process monitoring. In the case of the fungus *Penicillium simplicissimum*, a transformation by the polyethylene glycol (PEG) method (according to Yelton et al., 1984; Ballance and Turner, 1985 and Lopes et al., 2004) was likewise conducted, such that intrinsic fluorescence is possible here too for observation of the demands mentioned. After transformation, a fluorescence microscope is sufficient to be able to monitor the process. Viewing took place with the Axio Imager A1 fluorescence microscope with AxioCam MRn and Filter Set 09; excitation wavelength of 450-490 nm and emission of LP 515 nm, Zeiss, Jena, Germany).

The laser-structured sample of size 2×2 cm2 is laden with 150 μl of a solution of *Pseudomonas fluorescens* and LB medium [Carl Roth GmbH+Co. KG, Karlsruhe] [100 μl]/ glucose [50 μl] mixture. The cell suspension is sucked into the channels by capillary forces. In the case of *Penicillium simplicissimum*, the loading is likewise effected by the application of 150 μl of a mixture of a stock solution with liquid potato extract-glucose broth [Carl Roth GmbH+Co. KG, Karlsruhe]. The capillary effect results in automatic suction of the cell solution into the cavities.

The hydrophobization of the surface by the *Pseudomonas fluorescens* biofilm and by the *Penicillium simplicissimum* mycelium was determined by contact angle measurements (Krüss DAS 100S) by the captive bubble/sessile bubble method.

Under the fluorescence microscope, the advanced colonization of the laser-structured cavities by *P. simplicissimum* after incubation for 120 hours and for 24 hours is clearly apparent. It is apparent that the fungus already covers the full substrate area and additionally spreads further. *P. simplicissimum* is accordingly vital and capable of colonizing the entirety of the laser-structured habitat.

Corresponding experiments have also been conducted with the transformed bacterium *Pseudomonas fluorescens*. Here too, high colonization of the laser-structured material by vital cells after four weeks was found, detected via living/dead staining and the fluorescence of the transformed cells.

The contact angle measurements (stainless steel; L12) gave contact angles of) 20° (+3° for the reference samples. The values for *Pseudomonas fluorescens*, after an incubation time of 14 weeks, were) 61° (+3°. For *P. simplicissimum*, values of) 80° (+3° were found. The incubation time here was 14 days (room temperature 22° C.±2° C.). Hydrophobization is proportional to the biofilm/to the spread of the fungal mycelium.

Literature for this Example

1. Balance D. J. and Turner, G. (1985): "Development of a high-frequency transforming vector for *Aspergillus nidulans*." Gene, 36 (3), 321-331.
2. Hanahan, D. (1983): "Studies on transformation of *Escherichia coli* with plasmids". J. Mol. Biol. 166, 557-580.
3. Mandel, M. and Higa, A. (1970): "Calcium-dependent bacteriophage DNA infection." J. Mol. Biol. 53, 154-162.
4. Lopes, F. J. F., Araújo de, E. F and Queiroz de, M. V. (2004): "Easy detection of green fluorescent protein multicopy transformants in *Penicillium griseoroseum*. Genet. Mol. Res. 3 (4), 449-455.
5. Yelton, M. M., Hamer, J. E. and Timberlake, W. E. (1984): "Transformation of *Aspergillus nidulans* by using a trpC plasmid." Proc. Natl. Acad. Sci. USA, 81, 1470-1474.

The outcome of this experiment is that the articles of the invention can be used for improvement of the binding characteristics not only of eukaryotic cells but also of prokaryotic cells, and especially of bacterial organisms and fungi, each compared to an untreated substrate.

Example 19: Aluminum-Aluminum Composite Casting

By means of diecasting, it is possible to produce mechanical bonds between sheet inserts, for example of steel or aluminum, and aluminum components from the aluminum melt. The mechanical stability of the interface layer is reduced here since it is not possible to achieve cohesive bonds on account of the high melting temperature of the metal oxides of the sheet inserts. Therefore, the sheet inserts to be incorporated by casting are structured with an undercut channel structure of the invention by means of laser methodology, wherein the infiltration of the melt into the channel structure achieves a cohesive bond between aluminum sheet insert and cast component. The maximum bond strength is ascertained by lap shear tests.

Materials Used:
Sheet inserts of the AlZnMgCu1.5 forging alloy having dimensions of 40 mm×100 mm×1.5 mm
1.4301 steel sheet inserts having dimensions of 40 mm×100 mm×1.5 mm
Silafont 36 AlSi10MnMg diecasting alloy Laser Treatment:
Laser: 100 W Nd:YAG laser (CL100 type from Clean-Laser, Herzogenrath, Germany, with stamp optics and f((330) and f(160) f-theta lens).
Energy distribution in the laser spot: Gaussian
Spot diameter at the focus: 107 µm and 52 µm
The laser optics and the samples to be treated are within a laser protection cell (aluminum) with extraction.

TABLE 14

Laser parameters for the two-stage surface structuring of the aluminum sheet inserts

| Parameter | Spot diameter at the focus mm | Fluence (single pluse) J/cm² | Power W | Pulse repetition frequency kHz | Pulse duration ns | Number of of directly successive laser treatments per position | Pulse overlap in x direction (line overlap) µm | Pulse overlap in y direction (scanning direction) µm | Number of cycles |
|---|---|---|---|---|---|---|---|---|---|
| L13 | 0.107 | 10.6 | 100 | 100 | 100 | 18 | 267.5 | 53.5 | 1 |
| L14 | 0.107 | 10.6 | 100 | 100 | 100 | 18 | 214 | 53.5 | 1 |
| L1s | 0.052 | 45 | 100 | 100 | 100 | 22 | 160 | 65 | 1 |
| L2s | 0.107 | 10.6 | 100 | 100 | 100 | 26 | 160 | 65 | 1 |
| L13s | 0.107 | 10.6 | 100 | 100 | 100 | 30 | 160 | 70 | 1 |
| L22s | 0.107 | 10.6 | 100 | 100 | 100 | 20 | 100 | 50 | 1 |

The channel structure of the invention is created by the orthogonal superposition of two trench structures. For the two-stage process, undercut trenches of width 75 μm are first created at right angles to the flow direction of the melt with the parameter L13 (see FIG. 15a. This is followed by structuring offset by 90° with the parameter L14, which creates trenches of width 75 μm parallel to the flow direction of the melt (see FIG. 15b). By virtue of the superposition, the upper trenches running parallel to flow direction are connected beneath by the prior structuring. FIG. 15c shows the orthogonal superposition of the structures from FIGS. 15a and 15b.

Figure 15:
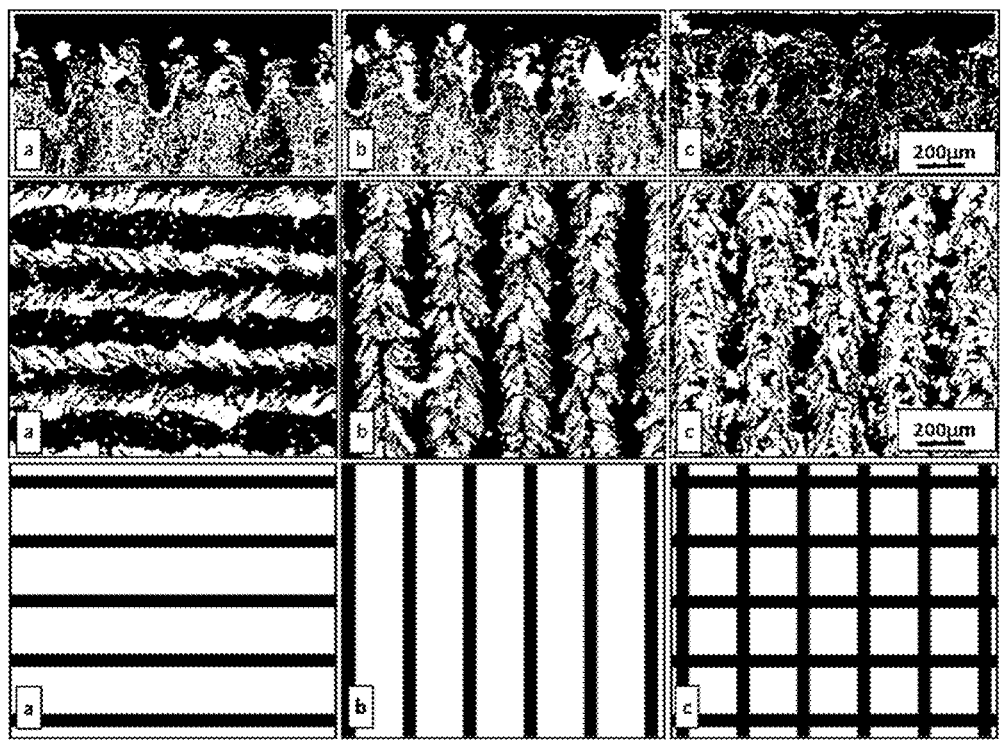
FIG. 15*a* shows microscope images and a schematic diagram of the channel structures on aluminum (AlZnMgCu1.5) that have been produced by means of laser methodology including structure with parameter L13 at right angles to the flow direction of the melt.
FIG. 15*b* shows microscope images and a schematic diagram of the channel structures on aluminum (AlZnMgCu1.5) that have been produced by means of laser methodology including structure with parameter L14 parallel to the flow direction of the melt.
FIG. 15*c* shows microscope images and a schematic diagram of the orthogonal superposition of the structures from FIGS. 15*a* and 15*b*.

FIG. 15 shows microscope images and schematic diagrams of the channel structures on aluminum (AlZnMgCu1.5) that have been produced by means of laser methodology. a: structure with parameter L13 (at right angles to the flow direction of the melt), b: structure with parameter L14 parallel to the flow direction of the melt).

Composite Casting

The aluminum sheet inserts having dimensions of 39.9 mm×99 mm×1.5 mm were structured over their full width and a height of 2 mm first with parameter L13 at right angles to the flow direction of the melt and then with parameter L14 parallel to the flow direction of the melt, so as to form the channel structure of the invention (see FIG. 15).

The steel sheet inserts having the dimensions of 39.9 mm×99 mm×1.5 mm were structured over their full width and a height of 10 mm first with the parameters L1s, L2s L13s and L22s, so as to form the channel structures of the invention.

The structured sheet inserts were incorporated by casting with the aid of a Bühler SC N 66 cold-chamber diecasting system using a cutting speed of 40 m/s and a hold pressure of 750 bar. The temperature of the aluminum melt was 740° C. After quenching, the samples were additionally subjected to heat aging at a temperature of 170° C. for eight hours. The cast structured bare sheet inserts that serve as reference samples were tested by a lap shear test to DIN EN 1465 on a Zwick-Roell Z020 or Z050 testing system. Testing was effected here with a 20 kN or a 50 kN load cell and a testing speed of 10 mm/min. The lap shear sample is composed of the sheet insert (39.9 mm×99 mm×1.5 mm) and the cast component overlapping on one side (40 mm×98 mm×10 mm). The overlap is over the full width and over a length of 40 mm.

Results:

The results of five individual measurements were used to form an average. A collation of the lap shear strengths together with the corresponding standard deviation can be found in FIG. 16 for aluminum-aluminum composites, and in FIG. 17 for aluminum-steel composites.

Figure 16:
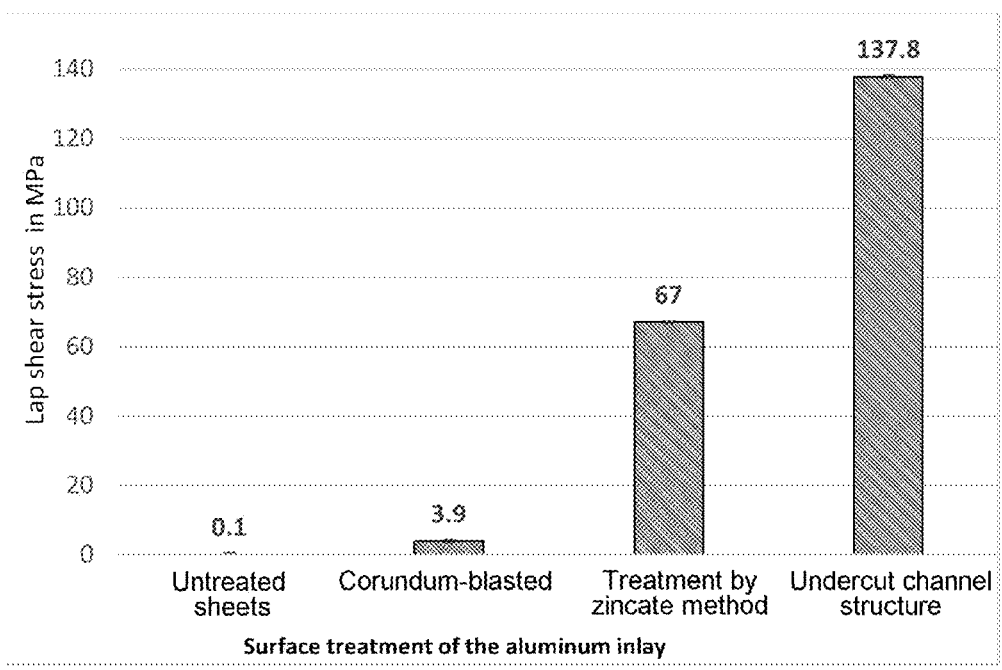
FIG. 16 shows lap shear strengths of casting-incorporated aluminum sheet inserts untreated and with various pretreatments.

FIG. 16 shows lap shear strengths of casting-incorporated aluminum sheet inserts with various pretreatments.

Figure 17:
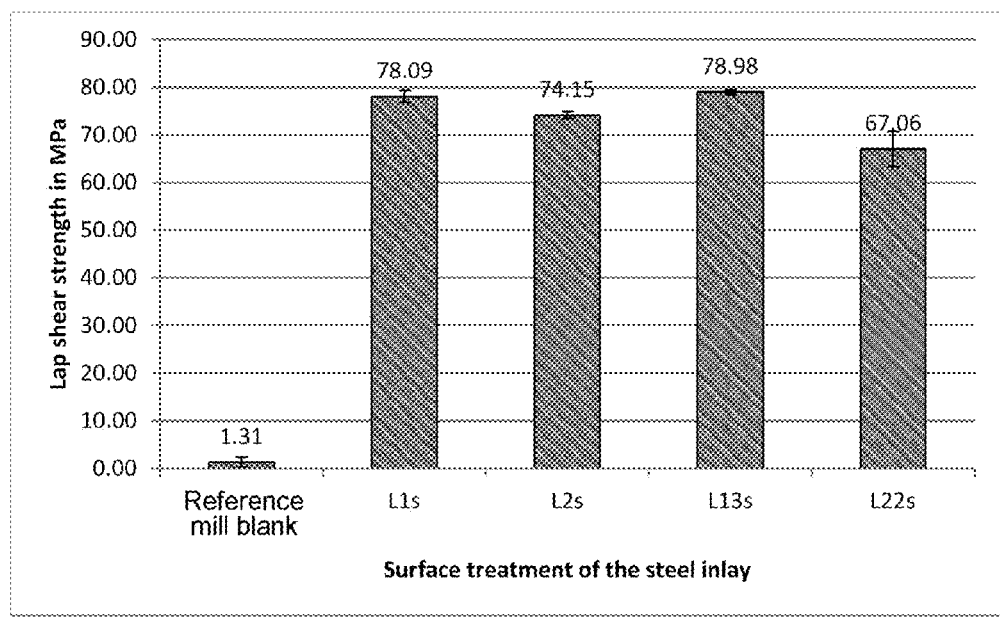
FIG. 17 shows lap shear strengths of a reference mill blank and casting-incorporated steel sheet inserts with various pretreatments.

FIG. 17 shows lap shear strengths of casting-incorporated steel sheet inserts with various pretreatments.

It is clearly apparent that, using the channel structure c in the case of aluminum sheet inserts that results from the orthogonal superposition of structures a and b, it is possible to achieve a significant increase in lap shear strength compared to the untreated or corundum-blasted samples. Moreover, the pretreatment of the inserts by laser structuring enables doubling of the bond strength compared to cohesive bonds by means of pretreatment by the zincate method (according to Papis, K.; Hallstedt, B.; Löffler, J.; Uggowitzer, P.; Interface formation in aluminium-aluminium compound casting, Acta Materialia 56, 2008). Compared to the rolled blank steel surface, the laser structures of the invention with laser parameter L13s show high strengths and low standard deviations at more than 79÷0.5 MPa in the cast aluminum composite.

Overall, it is found that the articles of the invention can generally be used for improvement of lap shear strength for cohesive bonds compared to substrates that do not have the structuring envisaged in accordance with the invention. This is especially true of, but not limited to, cohesive bonds that have been produced by the diecasting method.

Example 20: Mass Transfer, Microscale Fluid Reactor

Microscale fluid reactors enable controlled chemical reactions on the sub-millimeter scale. They are notable for good reaction kinetics and heat exchange coefficients. The undercut channel structures of the invention can be used for such microscale reactors. As a result, it is possible to equip metallic surfaces with microscale reactors.

Material Used:
1.4301 steel—10×10×0.1 mm sheet

Laser Treatment:
Laser: 100 W Nd: YAG laser (CL100 type from CleanLaser, Herzogenrath, Germany, with stamp optics and f(330) f-theta lens).

The laser optics and the samples to be treated were in a laser protection cell (aluminum) with extraction. For avoidance of particle redeposition, the samples were additionally purged during the laser treatment with a compressed air stream of 45 l (STP)/min (inlet pressure 8 bar; 20° C.) with the aid of a compressed air nozzle (mounted at an angle of 45°; directed directly onto the samples).

The laser treatment was effected with the parameters LA, LB and LC.

TABLE 15

Laser parameters for microscale reactor

| Parameter | Spot diameter at the focus mm | Fluence (single pluse) J/cm² | Power W | Pulse repetition frequency kHz | Pulse duration ns | Number of of directly successive laser treatments per position | Pulse overlap in x direction (line overlap) μm | Pulse overlap in y direction (scanning direction) μm | Number of cycles |
|---|---|---|---|---|---|---|---|---|---|
| LA | 0.107 | 10.6 | 100 | 100 | 100 | 20 | 400 | 65 | 1 |
| LB | 0.107 | 10.6 | 100 | 100 | 100 | 20 | 400 | 65 | 2 |
| LC | 0.107 | 10.6 | 100 | 100 | 100 | 20 | 240 | 65 | 1 |

Figure 18:
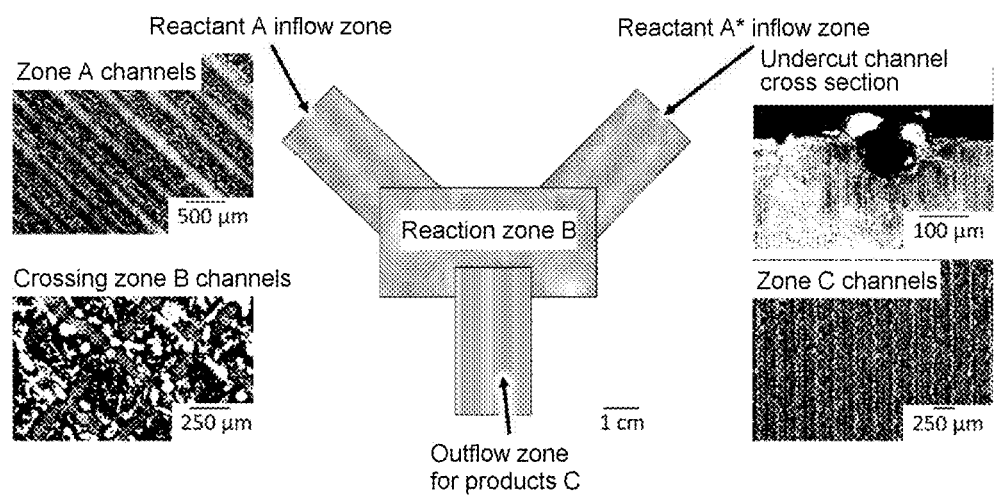
FIG. 18 shows the schematic setup of a microreactor composed of the undercut channel structures of the invention, and microscope images of the individual zones and of an illustrative channel cross section.

Reactor Setup:

FIG. 18 shows the schematic setup of a microreactor composed of the undercut channel structures of the invention, and microscope images of the individual zones and of an illustrative channel cross section.

For production of the reactor, the undercut channels of the invention were first lasered onto the steel surface with the laser parameter LA in the form of two inflow zones A and A*. These inflow zones serve to introduce the reactants and are connected to one another via a reaction zone B. This reaction zone B was implemented by lasering parallel undercut channels orthogonally in two cycles onto the surface with the laser parameter LB, such that the channels cross. Subsequently, an outflow zone C for the reaction product via parallel channels was lasered onto the surface with the parameter LC, which is connected to the reaction zone B via the undercut channels.

Evidence of Function:

For evidence of a reaction, sodium hydroxide solution (2% by weight in water) and a fluorescein-water-ethanol mixture in a ratio of (0.1:6:24) were used as reactants. These reactants were pipetted onto one of the inflow zones A and A*, in each case with three 20 µl droplet of the respective solutions. Reaction was detected by fluorescence detection with a UV lamp, with reaction of the initially colored form of fluorescein with sodium hydroxide solution, eliminating water and sodium ions to give a fluorescent molecule. The reservoir used for the reaction products was a quadruply folded absorptive cloth (Kimberly Clark 7552, Kimtech Science precision cloths) that had been pressed onto the surface of the outflow zone C.

Observation and Result:

The reactants at first wet the channels of the inflow zones A and A* within one second, which can be observed from the channel openings.

Figure 19:
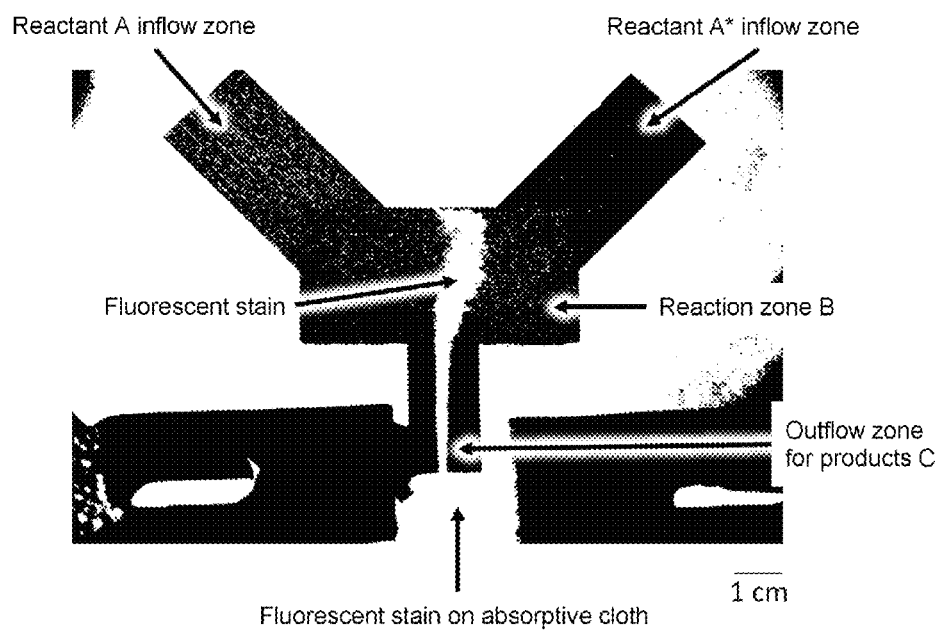
FIG. 19 shows a microscale reactor having inflow zones A and A*, the white fluorescence in the reaction zone B as evidence of the reaction of fluorescein with sodium hydroxide solution, and the flow of the products to the absorptive cloth in zone C.

FIG. 19 shows a microscale reactor having inflow zones A and A*, the white fluorescence in the reaction zone B as evidence of the reaction of fluorescein with sodium hydroxide solution, and the flow of the products to the absorptive cloth in zone C.

FIG. 19 documents visible fluorescence through the channel openings in the reaction zone B after about two seconds. This is the evidence of reaction of the two reactant solutions that mix in reaction zone B. The fluorescence is visible in the form of a volume flow along a reaction zone. After about four seconds, the reaction products arrive at the absorptive cloth, which likewise fluoresces. (The time is measured from a video documentation of the experiment.)

The result of this experiment shows it that the articles of the invention as part of the invention can also be used as reactor or part of a reactor for chemical reactions.

The invention claimed is:

1. An article having:
   a metal substrate;
   a channel defined by a wall encasing the channel in the metal substrate;
   wherein the channel has an opening at a surface of the article;
   wherein a cross section of the channel has a local width maximum (5) between a base (7) of the channel and a contact plane (1) when measured at a widest section of the cross section of the channel;
   wherein the contact plane (1) is defined as the plane corresponding to a secant that runs through two contact points of a circle having a radius of 3 mm disposed on the opening of the channel from a perspective of the cross section of the channel; and
   wherein a region proximal to the wall of the channel has a heat-affected zone having an altered grain size structure as compared to a grain size structure of the metal substrate which is not heat affected;
   a first heat-affected zone disposed proximal to the opening of the channel;
   wherein a ratio of a smaller average statistical grain size of the first heat-affected zone compared to an average statistical grain size of the metal substrate which is not heat affected is ≤1:2; and
   a second heat-affected zone disposed proximal to the channel at a lowest point vertically of the cross section of the channel or at the cross section of the channel;
   wherein the second heat-affected zone has a thickness of 0.1 µm to 3000 µm; and
   wherein a ratio of a smaller average statistical grain size of the second heat affected zone disposed proximal to the channel at the lowest point vertically of the cross section of the channel compared to the average statistical grain size of the metal substrate which is not heat affected is ≤1:1.2; and
   wherein a ratio of a greater average statistical grain size of the second heat-affected zone as compared to the smaller average statistical grain size of the first heat affected zone is ≥2:1.2.

2. The article as claimed in claim 1, wherein the local width maximum (5) is ≥0.5 µm beneath the contact plane (1).

3. The article as claimed in claim 1, wherein the local width maximum (5) measured at right angles to a longitudinal axis of the channel is ≥1 µm.

4. The article as claimed claim 1, wherein the channel has an aspect ratio of the local width maximum (5), measured at right angles to the longitudinal axis of the channel, to a length of the channel, measured parallel to the surface of the article of ≤1:3.

5. The article as claimed in claim 1, wherein the channel measured at right angles to the contact plane (1) has a depth (3) of 0.1 µm to 10 000 µm.

6. The article as claimed in claim 1,
   wherein the opening of the channel measured in the contact plane (1) at right angles to the longitudinal axis of the channel has a width in a range of 0.05 µm to 2000 µm.

7. The article as claimed in claim 1, wherein a percentage of the opening of the channel is covered in an amount of ≥30% based on a plane formed by the local width maximum (5) within the channel parallel to the contact plane (1).

8. The article as claimed in claim 1, wherein the metal substrate is selected from the group consisting of titanium, aluminum, vanadium, magnesium, copper, silver, lead, gold, alloys thereof with one another or with further metals, and steel.

9. The article as claimed in claim 1, wherein the article has an oxygen-enriched layer disposed along an inner surface of the wall of the channel opposed to an outer surface of the wall of the channel adjacent the metal substrate;
   wherein an oxygen enrichment of the oxygen-enriched layer has a depth of 50 nm, as measured by x-ray photoelectron spectroscopy after the oxygen-enriched layer is disposed.

10. A process for producing the article having the metal substrate as claimed in claim 1 comprising the steps of:
   a) providing a pre-process article having a pre-process metal substrate; and b) irradiating the pre-process metal substrate with a pulsed laser radiation from a pulsed laser;

wherein irradiation is effected at a same site with a laser pulse of at least 2 pulses in a laser pulse repetition frequency of at least 0.1 kHz, and wherein the pulsed laser radiation has a wavelength in a range from 400 nm to 30 µm and a laser pulse length in a range of 500 ps to 100 s, thereby producing the article having the metal substrate as claimed in claim 1.

11. The process as claimed in claim 10, wherein the pulsed laser radiation has a wavelength in a range from 950 nm to 12 µm.

12. The process as claimed in claim 10, wherein the laser pulse repetition frequency is in a range from 0.1 kHz to 4 MHz.

13. The process as claimed in claim 10, wherein the laser pulse length is in a range of 1 ns to 1 µs.

14. The process as claimed in claim 10, wherein an energy density measured in a sample position by means of a pyroelectric sensor in a laser beam focus is 0.1 J/cm$^2$ to 100 J/cm$^2$.

15. The process as claimed in claim 10, wherein an energy distribution in a laser spot has a profile selected from the group consisting of a Gaussian profile, a flat-top profile, and a top-hat profile.

16. The process as claimed in claim 10, wherein step b) is conducted in a range of 2-1000 cycles with a time interval in a range of at least 0.01 s to 0.25 µs.

17. The process as claimed in claim 10, wherein the pulsed laser of step b) is a continuous wave or quasi continuous wave laser; and wherein a local residence time of the laser pulse in a surface region corresponding to a spot size is at least 5 ns.

18. The process as claimed in claim 10, wherein, after step b), the pulsed laser is moved such that, in a repetition of step b), a plurality of pores created collectively result in the channel.

* * * * *